(12) United States Patent
Fisher et al.

(10) Patent No.: US 12,496,050 B2
(45) Date of Patent: Dec. 16, 2025

(54) OSCILLATING SYRINGE SYSTEM AND NEEDLE

(71) Applicant: Praxis Holding LLC, Tampa, FL (US)

(72) Inventors: John Steele Fisher, Belleair, FL (US); Nathaniel H. Pariseau, Tampa, FL (US); Wayne A. Noda, Mission Viejo, CA (US); Daniel Hyman, Foothill Ranch, CA (US); Jon Jacobson, Irvine, CA (US); Christopher M. Drake, Portsmouth, NH (US); Matt Pursley, Dawsonville, GA (US)

(73) Assignee: Praxis Holding LLC, Tampa, FL (US)

( * ) Notice: Subject to any disclaimer, the term of this patent is extended or adjusted under 35 U.S.C. 154(b) by 1043 days.

(21) Appl. No.: 17/545,097

(22) Filed: Dec. 8, 2021

(65) Prior Publication Data

US 2022/0096065 A1 Mar. 31, 2022

Related U.S. Application Data

(63) Continuation-in-part of application No. 16/996,774, filed on Aug. 18, 2020, now Pat. No. 12,232,710, and a continuation-in-part of application No. 16/986,248, filed on Aug. 5, 2020, now Pat. No. 11,717,274, which is a continuation of application No. 16/411,091, filed on May 13, 2019, now Pat. No. 10,765,411, said application No. 16/996,774 is a continuation of application No. 16/411,091, filed on May 13, 2019, now Pat. No. 10,765,411.

(Continued)

(51) Int. Cl.
| | | |
|---|---|---|
| A61B 10/02 | (2006.01) | |
| A61B 17/32 | (2006.01) | |
| A61B 17/34 | (2006.01) | |

(52) U.S. Cl.
CPC ...... *A61B 10/0283* (2013.01); *A61B 17/3476* (2013.01); *A61B 2017/32007* (2017.08)

(58) Field of Classification Search
CPC ............ A61B 10/0283; A61B 17/3476; A61B 2017/32007; A61B 2010/0208; A61B 10/0266; A61M 2005/3139; A61M 2005/3289
See application file for complete search history.

(56) References Cited

U.S. PATENT DOCUMENTS 3,811,442 A * 5/1974 Maroth .................. A61M 5/20
604/188
4,605,011 A * 8/1986 Naslund ............. A61B 10/0283
600/568

(Continued)

FOREIGN PATENT DOCUMENTS

WO 2009058436 A1 5/2009

*Primary Examiner* — Patrick Fernandes
(74) *Attorney, Agent, or Firm* — Nicholas Pfeifer; Trenam Law

(57) ABSTRACT

A syringe is coupled to a biopsy needle through a coupling structure that includes a motor-driven element such as a gear to rotate the needle. The motor can oscillate back and forth to cause the needle to oscillate. Structures are described to permit one-handed operation of the device and automatic motor activation based on attaining a desired plunger position. Non-electric motors are described along with a mechanism for axial oscillation of the needle.

20 Claims, 37 Drawing Sheets

Related U.S. Application Data

(60) Provisional application No. 63/122,671, filed on Dec. 8, 2020, provisional application No. 62/756,374, filed on Nov. 6, 2018, provisional application No. 62/738,849, filed on Sep. 28, 2018.

(56) References Cited

U.S. PATENT DOCUMENTS

| | | | |
|---|---|---|---|
| 6,086,543 A * | 7/2000 | Anderson | A61B 10/0233 600/567 |
| 6,702,761 B1 | 3/2004 | Damadian et al. | |
| 7,828,748 B2 | 11/2010 | Hibner | |
| 2004/0153003 A1* | 8/2004 | Cicenas | A61B 10/0275 600/564 |
| 2005/0171486 A1* | 8/2005 | Hochman | B01J 19/0046 604/218 |
| 2007/0149893 A1 | 6/2007 | Heske et al. | |
| 2012/0078180 A1* | 3/2012 | Fujioka | A61J 1/20 604/131 |
| 2015/0005662 A1* | 1/2015 | Brik | A61B 10/0283 600/566 |
| 2015/0148615 A1* | 5/2015 | Brennan | A61B 3/16 128/853 |
| 2015/0283334 A1 | 10/2015 | Marx et al. | |
| 2017/0043137 A1* | 2/2017 | Felkins | A61M 25/0097 |

* cited by examiner

SECTION A-A

DETAIL B

OSCILLATING SYRINGE SYSTEM AND NEEDLE

CROSS-REFERENCE TO RELATED APPLICATIONS

This nonprovisional application is a continuation in part of and claims priority to nonprovisional application Ser. No. 16/996,774, entitled "OSCILLATING SYRINGE SYSTEM," filed Aug. 18, 2020 by the same inventor(s), which is a continuation of and claims priority to nonprovisional application Ser. No. 16/411,091 filed May 13, 2019, and issued on Sep. 8, 2020, as U.S. Pat. No. 10,765,411, entitled "OSCILLATING SYRINGE SYSTEM," by the same inventor(s), which claims priority to (1) provisional application No. 62/756,374 filed Nov. 6, 2018 by the same inventor(s) and (2) provisional application No. 62/738,849 filed Sep. 28, 2018 by the same inventor(s).

This nonprovisional application is a continuation in part of and claims priority to nonprovisional application Ser. No. 16/986,248, entitled "OSCILLATING SYRINGE SYSTEM," filed Aug. 5, 2020 by the same inventor(s), which is a continuation of and claims priority to nonprovisional application Ser. No. 16/411,091 filed May 13, 2019, and issued on Sep. 8, 2020, as U.S. Pat. No. 10,765,411, entitled "OSCILLATING SYRINGE SYSTEM," by the same inventor(s), which claims priority to (1) provisional application No. 62/756,374 filed Nov. 6, 2018 by the same inventor(s) and (2) provisional application No. 62/738,849 filed Sep. 28, 2018 by the same inventor(s).

This nonprovisional application also claims priority to provisional application No. 63/122,671, entitled "BIOPSY NEEDLE WITH CUTTING STRUCTURE AND RELATED METHOD OF MANUFACTURE," filed Dec. 8, 2020 by the same inventor(s).

BACKGROUND OF THE INVENTION

1. Field of the Invention

The application relates generally to syringe systems, and more particularly to biopsy syringe systems with oscillating needles.

2. Brief Description of the Prior Art

It may be necessary to extract tissue from a patient for analysis to support diagnosis. For example, it may be necessary to extract tissue for "cytological" or cell harvest, as well as cores of tissue for breast biopsies, to ascertain the existence of disorders of the tissue.

Tissue extraction may be done by inserting a needle into the patient to withdraw tissue into the needle, which is then removed from patient for dispensing the tissue onto analysis equipment.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

In the present assignee's co-pending U.S. patent application Ser. No. 16/013,522, incorporated herein by reference, a motorized convenient tissue extraction device is disclosed that conveniently avoids multiple needle insertions in the patient to obtain sufficient tissue for analysis while harvesting sufficient tissue for analysis.

Present principles are directed to oscillating the motorized needle to prevent the needle from being wrapped in connective fibrous tissues. Present principles are also directed to techniques for facilitating one-handed operation of the device to leave the other hand free for, e.g., positioning an ultrasound probe for imaging, while activating the motor automatically when the correct plunger position is attained.

Accordingly, in an aspect, a device includes a needle having a tip and a hollow interior and a syringe coupled to the needle. A tissue chamber is established at least in part by the hollow interior of the needle. A motor is coupled to the needle to rotate the needle back and forth. The syringe includes a barrel and a plunger slidably disposed in the barrel and movable to evacuate the tissue chamber, and a plunger activation assembly includes a receptacle configured for closely receiving a proximal flange of the plunger. Opposed arms extends distally away from the receptacle. At least one of the arms includes an inclined ramp that abuts a motor activation switch in a first plunger position to activate the motor and that does not abut the motor activation switch in a second plunger position to deactivate the motor.

The plunger activation assembly can include a thumb ring extending proximally away from the receptacle.

In example embodiments, a housing supports the barrel and at least one finger ring extends transversely away from the barrel. If desired, at least one of the arms is formed with at least one notch, and a detent arm can extend generally parallel to the plunger and can include a detent adjacent a free end of the detent arm. The detent arm is biased to a first position, in which the detent engages the notch, and can be moved to a second position, in which the detent does not engage the notch. The detent may be movable to the second position by a detent button.

In another aspect, a device includes a needle having a tip and a hollow interior, a syringe coupled to the needle, and a tissue chamber established at least in part by the hollow interior of the needle. A motor is coupled to the needle to oscillate the needle back and forth while the tissue chamber is evacuated to facilitate drawing cells from tissue into the tissue chamber. The syringe includes a barrel and a plunger slidably disposed in the barrel, the barrel is supported by a housing, and a linkage is coupled to the housing and is movable between a first configuration, in which the linkage is V-shaped and distanced from a motor switch to deactivate the motor, and second configuration, in which the linkage is substantially straight and engages the motor switch to energize the motor. If desired, a plunger activation assembly may be provided with a receptacle configured for closely receiving a proximal flange of the plunger, and at least one plunger activation arm extends distally away from the receptacle. The linkage is connected to the plunger activation arm.

In another aspect, a device includes a needle having a tip and a hollow interior, a syringe coupled to the needle, and a motor coupled to the needle to oscillate the needle back and forth. The syringe includes a barrel and a plunger slidably disposed in the barrel, and a motor gear couples the motor to the needle. A seal such as an o-ring is between the motor gear a motor plate to seal to a component that includes a Luer fitting to attach to the syringe.

In another aspect, a device includes a needle having a tip and a hollow interior, a syringe coupled to the needle, and a motor coupled to the needle to rotate the needle. The syringe includes a barrel and a plunger slidably disposed in the barrel, and a movable activation mechanism is configured to permit one handed operation or a single one finger motion which starts the motor and pulls a vacuum in the needle.

In another aspect, a device includes a needle, a syringe coupled to the needle, and an electric or tension motor coupled to the needle to rotate the needle. A gear assembly couples the needle to the electric or tension motor to cause axial reciprocation of the needle.

In one example, the syringe includes a barrel and a plunger slidably disposed in the barrel, and the device further includes a movable activation mechanism configured to permit one handed operation or a single one finger motion which starts the motor and pulls a vacuum in the needle.

The motor may be an electric motor or a non-electric tension motor.

In a first example embodiment the gear assembly includes a first needle gear operable to rotate under influence of the motor and a fixed gear constrained from rotating under the influence of the motor. The first needle gear is coupled Hirth-fashion to the fixed gear such that teeth of the first needle gear rotate past and ride against teeth of the fixed gear to cause the first needle gear to reciprocate axially. A second needle gear may be concentric with the first needle gear and a drive gear may be concentric with the fixed gear and coupled Hirth-fashion to the second needle gear. The drive gear is coupled to the motor to rotate the second needle gear as the motor rotates the drive gear.

In another aspect, a device includes a needle, a syringe coupled to the needle, and a non-electric tension assembly coupled to the needle to rotate the needle.

In example embodiments of this aspect, a gear assembly couples the needle to the non-electric tension assembly to cause axial reciprocation of the needle.

In some implementations the syringe may include a barrel and a plunger slidably disposed in the barrel, and a movable activation mechanism is configured to permit one handed operation or a single one finger motion which starts the motor and pulls a vacuum in the needle.

In one example embodiment, the non-electric tension assembly includes a gear coupled to the needle to rotate the needle, an axle supporting the gear and engaged with a spring, with the axle being coupled to the activation mechanism to rotate as the activation mechanism moves, and a brake for selectively engaging the gear to prevent the gear from rotating. The axle is configured for rotation of the gear with the brake engaged to tension the spring. The brake s releasable from the gear to allow the spring to de-tension to rotate the gear and the needle.

In a second example embodiment, the non-electric tension assembly includes a drive gear, an axle on which the drive gear rotates, with the axle being coupled to the movable activation mechanism to rotate as the activation mechanism moves, and a spring gear meshed with the drive gear to rotate the spring gear against tension provided by a coil spring coupled to the spring gear. The spring gear also is meshed with a transfer gear that in turn is meshed with a needle drive gear to transfer rotational motion of the transfer gear to the needle drive gear to rotate the needle. Actuation of the activation assembly to move the plunger tensions the coil spring with the spring gear being stopped from rotation by a brake releasable to allow the spring gear to de-tension to rotate the needle.

In some embodiments, the biopsy device includes a biopsy needle having a main body extending between a proximal end and a distal end. A connector is located at the proximal end and is configured to operably engage the motor, such that the motor can rotate the biopsy needle. A cutting tip located at the distal end and a central longitudinal axis extends between the proximal and distal ends. In addition, a hollow interior extends through the main body and the connector, such that the hollow interior of the needle is in fluidic communication with the tissue collector.

Some embodiments of the biopsy needle include a first cutting aperture disposed through the main body. The first cutting aperture has a rectangular shape with a long end of the rectangular shape extending parallel to the central longitudinal axis of the biopsy needle. A second cutting aperture is also disposed through the main body. The second cutting aperture has a rectangular shape identical to the first cutting aperture with a long end of the rectangular shape extending parallel to the central longitudinal axis of the biopsy needle. Each of the first and second cutting apertures creates a channel with a central axis extending from an exterior surface of an interior surface of the main body, and the central axes of the channels are aligned. Furthermore, the first and second cutting apertures are longitudinally spaced in a proximal direction from the distal end of the main body, such that there is a continuous portion of the main body between the first and second cutting apertures and the distal end of the main body.

In some embodiments, the motor further includes a rotational axis that is co-linear with the central longitudinal axis of the biopsy needle. Some embodiments include a belt coupling the motor to the biopsy needle to cause the biopsy needle to rotate under influence of the motor. Some embodiments further comprise at least driven and drive gears coupling the motor to the biopsy needle to cause the biopsy needle to rotate under influence of the motor.

Some embodiments further include a valve in operable communication with a tissue evacuation passage extending between the biopsy needle and the tissue chamber, wherein the valve can lock vacuum in the tissue evacuation passage. In some embodiments, the valve is a slide valve. The slide valve has a slidable actuator configured to occlude the tissue evacuation passage when slid into a closed position.

Some embodiments further include a connector on the proximal end of the biopsy needle is a luer connector. In some embodiments, at least one hollow fitting engages a needle connector. The hollow fitting comprises a body and a driven gear circumscribing the body and meshed with a drive gear coupled to the motor. Some embodiments further include the hollow fitting engaged with a needle connector rotates against an O-ring engaged with the drive housing.

In some embodiments, the biopsy needle is no larger than twenty-five (25) gauge. In some embodiments, the first and second cutting apertures are diametrically opposed from each other about the main body of the biopsy needle.

In some embodiments, each of the cutting apertures are defined by a boundary circumscribing the aperture and the boundary is generally flush with an exterior surface of the main body. In some embodiments, each cutting aperture includes a beveled channel wall extending between the interior and an exterior surface of the main body of the biopsy needle to direct tissue into the interior of the biopsy needle. In some embodiments, each of the cutting apertures includes an outwardly, laterally extending flange relative to the central longitudinal axis of the needle.

In some embodiments, each cutting aperture is the same distance from the distal end of the biopsy needle. In some embodiments, the first cutting aperture is longitudinally spaced from the second cutting aperture, such that the two cutting apertures are at different distances from the distal end of the biopsy needle.

In some embodiments, a portion of the biopsy needle proximal to the of the cutting apertures includes a plurality of annular grooves circumscribing an exterior surface of the biopsy needle.

Some embodiments further include a third and a fourth cutting aperture disposed through the main body. The third cutting aperture has a rectangular shape with a long end of the rectangular shape extending parallel to the central longitudinal axis of the biopsy needle. The fourth cutting aperture has a rectangular shape identical to the first cutting aperture with a long end of the rectangular shape extending parallel to the central longitudinal axis of the biopsy needle. The third and fourth cutting apertures are longitudinally spaced in the proximal direction from the distal end of the main body, such that the continuous portion of the main body is between the third and fourth cutting apertures and the distal end of the main body. In addition, the third and fourth cutting apertures are diametrically opposed from each other about the main body of the biopsy needle and the third cutting aperture is circumferentially spaced from the first cutting aperture by generally 45 degrees.

Some embodiments further include a plurality of annular grooves proximate the cutting apertures. In some embodiments, the distal end of the biopsy needle includes a beveled tip.

Some embodiments of the present invention include a tissue extraction device, comprising a syringe coupled to an elongated needle for rotation of the needle relative to the syringe; an evacuatable tissue chamber being established at least in part by the hollow interior of the needle and configured to be subject to a vacuum; and a motor operably coupled to the needle to oscillate the needle back and forth in a longitudinal direction.

In some embodiments, the needle further includes a main body extending between a proximal end and a distal end with a cutting tip located at the distal end and a central longitudinal axis extending between the proximal and distal ends. A hollow interior extends through the main body, such that the hollow interior of the needle is in fluidic communication with the syringe.

Some embodiments include one or more cutting apertures proximate the distal end of the needle. In some embodiments, a first cutting aperture and a second cutting aperture are disposed through the main body. Both cutting apertures have a rectangular shape with a long end of the rectangular shape extending parallel to the central longitudinal axis of the biopsy needle. In some embodiments, each of the first and second cutting apertures creates a channel with a central axis extending from an exterior surface to an interior surface of the main body and said central axes of the channels are aligned. Some embodiments further include the first and second cutting apertures longitudinally spaced in a proximal direction from the distal end of the main body, such that there is a continuous portion of the main body between the first and second cutting apertures and the distal end of the main body.

In some embodiments, the syringe comprises a barrel and a plunger slidably disposed in the barrel and movable to evacuate the tissue chamber. In addition, the device further comprises a plunger activation assembly comprising a receptacle configured for closely receiving a proximal flange of the plunger and opposed arms extending distally away from the receptacle. At least one of the arms comprises an inclined ramp that abuts a motor activation switch in a first plunger position to activate the motor and that does not abut the motor activation switch in a second plunger position to deactivate the motor.

Some embodiments further include a housing supporting the barrel and a linkage coupled to the housing. The linkage is movable between a first configuration, in which the linkage is V-shaped and distanced from a motor switch to deactivate the motor, and second configuration, in which the linkage is substantially straight and engages the motor switch to energize the motor.

Some embodiments further include a control circuit configured to rotate the needle in a first direction when the motor is energized, and after a predetermined time period, rotate the needle in an opposite direction. In some embodiments, the device further comprises a movable activation mechanism configured to permit one handed operation or a single one finger motion which starts the motor and pulls a vacuum in the needle.

Some embodiments further include a gear assembly coupling the needle to the motor to cause axial reciprocation of the needle during operation of the motor. In some embodiments, the gear assembly includes a first needle gear operable to rotate under influence of the motor; and a fixed gear constrained from rotating under the influence of the motor. The first needle gear is coupled in a Hirth-fashion to the fixed gear such that teeth of the first needle gear rotate past and ride against teeth of the fixed gear to cause the first needle gear to reciprocate axially.

Some embodiments of the gear assembly also include a second needle gear concentric with the first needle gear and a drive gear concentric with the fixed gear and coupled in a Hirth-fashion to the second needle gear. The drive gear is coupled to the motor to rotate the second needle gear as the motor rotates the drive gear. In some embodiments the first and second needle gears are coupled with each other.

In some embodiments the motor is a non-electric tension assembly coupled to the needle to rotate the needle. Some embodiments further include a gear assembly coupling the needle to the non-electric tension assembly to cause axial reciprocation of the needle. In some embodiments, the non-electric tension assembly comprises a gear coupled to the needle to rotate the needle and an axle supporting the gear and engaged with a spring. The axle is coupled to the activation mechanism to rotate as the activation mechanism moves. In addition, a brake is configured for selectively engaging the gear to prevent the gear from rotating. The axle is configured for rotation of the gear with the brake engaged to tension the spring and the brake is releasable from the gear to allow the spring to de-tension to rotate the gear and the needle. In some embodiments, the actuation of the activation assembly to move the plunger tensions the coil spring with the spring gear being stopped from rotation by a brake releasable to allow the spring gear to de-tension to rotate the needle.

In some embodiments, the non-electric tension assembly comprises a drive gear; an axle on which the drive gear rotates; the axle being coupled to the movable activation mechanism to rotate as the activation mechanism moves; a spring gear meshed with the drive gear to rotate the spring gear against tension provided by a coil spring coupled to the spring gear; the spring gear being meshed with a transfer gear; and the transfer gear being meshed with a needle drive gear to transfer rotational motion of the transfer gear to the needle drive gear to rotate the needle.

The details of the present application, both as to its structure and operation, can best be understood in reference to the accompanying drawings, in which like reference numerals refer to like parts, and in which:

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

It is to be understood that principles of constructions and operation set forth in the above-incorporated U.S. patent application apply to the disclosure herein in relevant part taking account of the features set forth herein.

Figure 1:
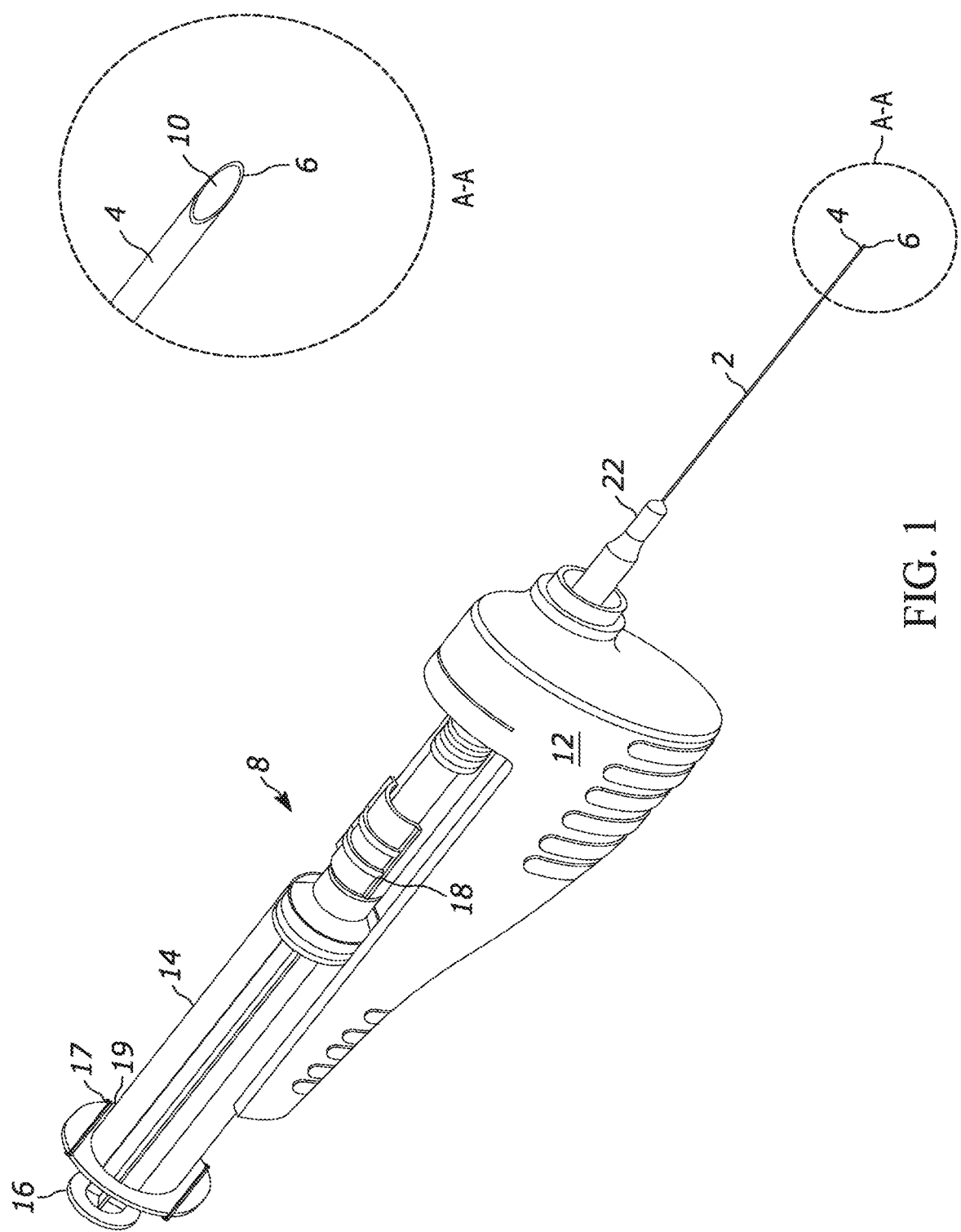
FIG. 1 is a perspective view of a first embodiment of a motor-driven needle assembly.

FIG. 1 shows a device that includes an elongated needle 2. The needle 2 may be a hollow metal hypodermic needle of a size of between 18 to 27 gauge, and more particularly 22-25 gauge with a cutting tip 4 as shown in detail A-A. The cutting tip 4 has a sharp cutting edge 6 that may be beveled as shown to facilitate cutting tissue when the needle 2 is advanced into tissue and rotated.

A syringe 8 is coupled to the needle 2 for rotation of the needle 2 relative to the syringe 8. An evacuatable tissue chamber 10 is established at least in part by the hollow interior of the needle 2. A motor, shown and described further below, is supported in a drive housing 12 and is coupled to the needle 2 to rotate the needle 2 while the tissue chamber 10 is evacuated and the needle 2 is disposed adjacent tissue to facilitate drawing cells from the tissue into the tissue chamber 10.

The syringe 8 typically includes a barrel 14 and a plunger 16 slidably disposed in the barrel 14 and movable to evacuate the tissue chamber 10. A valve such as a slide valve 18 (FIG. 1) or three-way stopcock or other valve structure may optionally be provided to lock vacuum in the tissue chamber 10, although in some embodiments vacuum is established by appropriate manipulation of the syringe without the need for a valve.

Completing the description of FIG. 1, in some embodiments a plunger lock mechanism 17 is engaged with the barrel 14, in this case with a proximal thumb flange 19 of the barrel 14, to engage one or more notches in the plunger 16 to impede advancing the plunger into the barrel (and for that matter to impede withdrawing the plunger out of the barrel). The plunger lock mechanism may include a stiff wire-like structure with a segment riding against the plunger 16 as the plunger is withdrawn proximally until the notch is juxtaposed with the segment to cause the segment to engage the notch under material bias. The plunger 16 can be rotatable in the barrel 14 to disengage the segment from the notch.

Figure 2:
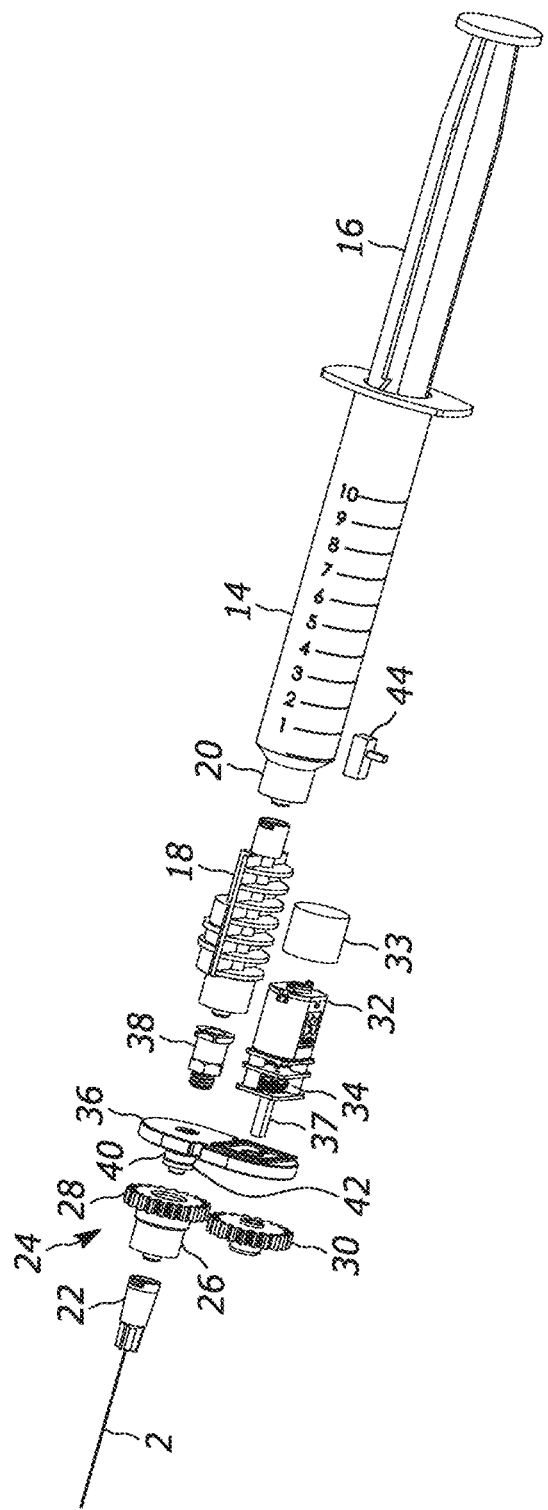
FIG. 2 is an exploded view of the assembly shown in FIG. 1.

In example embodiments, as best shown in FIG. 2 the syringe can include a distal end configured as a connector 20 (the distal end of the syringe 8 is obscured by the drive housing 12 in FIG. 1). The connector 20 may be configured as a Luer fitting. As shown in FIGS. 1 and 2, the needle 2 is engaged with a needle hub 22, and the syringe 8 is coupled to the needle 2 by a coupling that includes at least the needle hub 22 and the connector 20. The needle hub 22 can be established by a hollow Luer fitting such as a female Luer fitting.

As illustrated in FIG. 2 the above-mentioned coupling may include a hollow fitting 24 engaged with the needle hub 22. In the example shown, the hollow fitting 24 includes a body 26 that may be configured as a male Luer fitting and a driven gear 28 circumscribing the body 26 and meshed with a drive gear 30 that is coupled to a small electric dc-powered motor 32 through a reduction gear assembly 34, which reduces rotational speed to be between sixty (60) revolutions per minute (RPM) to three hundred fifty (350) RPM, inclusive (which is therefore the rotational speed of the needle 2). The motor may be a six-volt DC gear motor operating at three VDC and powered by a battery 33 in the motor housing. These specifications are examples only. A Lithium or alkaline or other type of battery may be used, and the motor could operate at other voltages, e.g., 12 VDC operated by a 9 VDC battery or 12 VDC battery at, e.g., 330 RPM.

A support assembly 36 may be engaged with the hollow fitting 24 to rotatably support the hollow fitting 24. Note that the output shaft 37 of the gear assembly 34 may extend through a hole of the support assembly 36 to connect to the drive gear 30, with the support assembly 34 radially supporting the output shaft 37 as the shaft spins.

The support assembly 36 is coupled to the connector 20 of the distal end of the syringe 8, if desired via at least one Luer fitting 38 that may be, e.g., glued to the support assembly 36. When the slide valve 18 is included (or another valve such as a stopcock), the Luer fitting 38 is connected to the distal end of the valve 18, which in turn is connected at its proximate end to the connector 20 of the syringe. The valve connectors may be configured as Luer fittings. A continuous fluid passageway is formed from the tip of the needle 2 into the barrel 14 of the syringe by the train of components described above, with the valve 18 being operable to selectively occlude the fluid passageway to draw a vacuum in the system when the plunger is retracted proximally.

The hollow fitting 24 may rotate on a boss 40 of the support assembly 36, against an O-ring 40 that circumscribes the boss 40 to establish a fluid seal between the support assembly 36 and hollow fitting 24 during rotation.

As can be appreciated in reference to FIGS. 1 and 2 and as mentioned above, a fluid passageway for fluid communication is established between the interior of the needle 2 and the syringe 8 by the needle hub 22, rotatable fitting 24, and support assembly 36 such that the syringe 8 is manipulable to evacuate the interior of the needle. The motor 32 that is coupled to the drive gear 30 that in turn is meshed with the driven gear 28 can be energized using a manipulable switch 44 such as a slide switch, toggle switch, moment switch, or other appropriate electrical switch to cause the needle 2 to rotate under influence of the motor 32 while the interior of the needle 2 is evacuated.

FIGS. 3-6 illustrate a first alternative embodiment and FIGS. 7-11 illustrate a second alternative embodiment in which both embodiments provide for one-handed operation of the syringe while energizing the motor to oscillate back and forth upon attaining a desired plunger position. It is to be understood that both embodiments in FIGS. 3-11 may incorporate components from FIGS. 1 and 2, e.g., the distal portions including the needle, etc.

Cross-referencing FIGS. 3-6, a device 200 includes an elongated needle having a cutting tip and a hollow interior such as shown and described above in reference to FIGS. 1 and 2, and a syringe 202 coupled to the needle for rotation of the needle relative to the syringe. An evacuatable tissue chamber is established at least in part by the hollow interior of the needle as described above. The syringe 202 includes an elongated hollow cylindrical barrel 204 and an elongated plunger 206 slidably disposed in the barrel 204 and movable to evacuate the tissue chamber.

An electric motor (FIG. 5) is coupled to the needle to oscillate the needle back and forth while the tissue chamber is evacuated, and the needle is disposed in tissue to facilitate drawing cells from the tissue into the tissue chamber. Oscillation reduces winding of fibrous connective tissue around the needle, which may otherwise make needle retraction difficult. FIGS. 12-16, described further below, provide example elegant designs that use only discrete components to control the voltage polarity to cause the DC motor to alternate directions, every few revolutions without requiring software.

In FIGS. 3-6, a plunger activation assembly is provided that includes a receptacle 210 oriented generally perpendicular to the long axis defined by the syringe 202 that includes an open top 212 (best shown in FIG. 4) for closely receiving a proximal flange 214 of the plunger 206. Elongated opposed arms 216 extend distally away from the receptacle 210 as shown. A hollow thumb ring 218 extends proximally away from the receptacle 210 for receiving the thumb of an operator of the device. In examples, the receptacle 210, thumb ring 218, and arms 216 are made unitarily with each other from a single piece of molded plastic.

Figure 3:
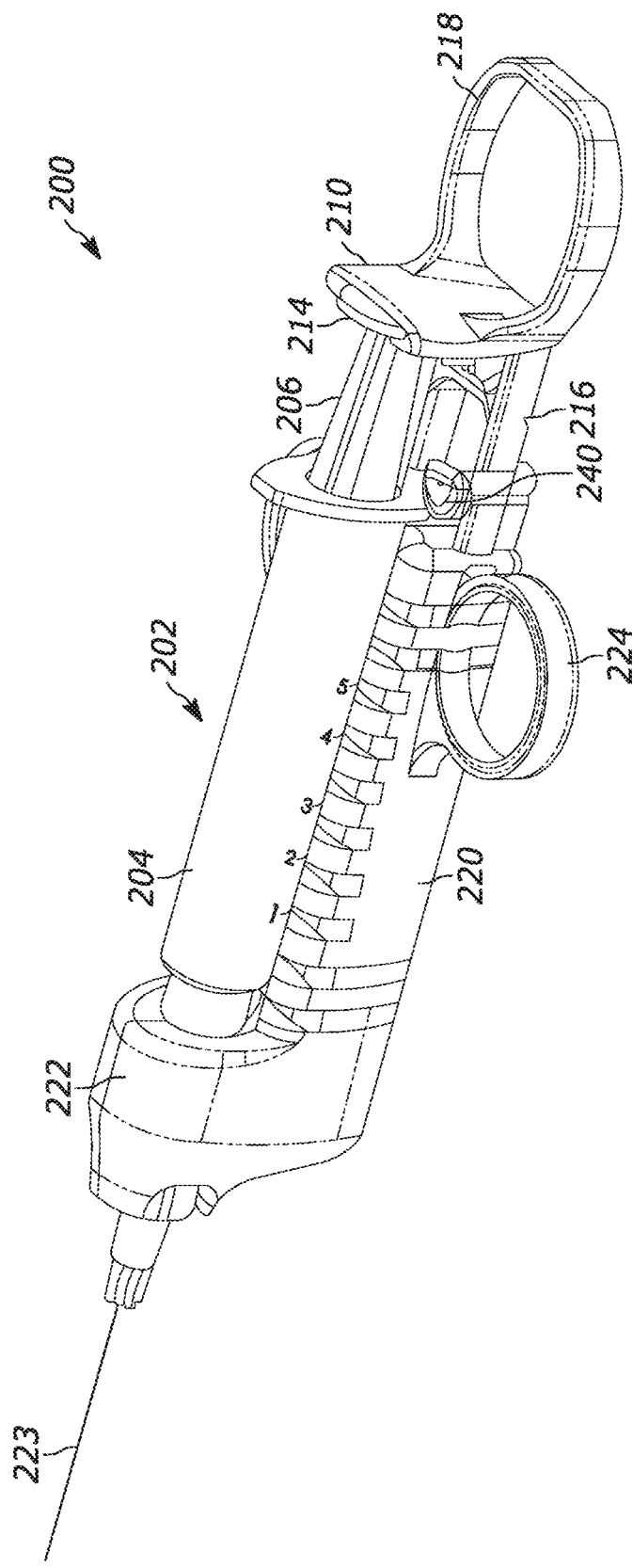
FIG. 3 is a perspective view of an embodiment of a needle assembly in which finger rings permit one-handed plunger control and the motor is activated by motion of a ramp coupled to the plunger riding against a motor switch, omitting the needle and certain other components at the distal end for clarity.

As shown in FIG. 3, the syringe 202 is disposed in a semi-cylindrical trough of a housing 220 with the distal portion of the syringe extending through a gear enclosure 222 of the housing 220 from which a needle 223 extends for rotation of the needle by the motor. The housing 220 contains the below-described motor and motor-related activation components. Left and right finger rings 224 may be provided on the housing and may extend transversely outwardly therefrom to receive fingers of the operator. The thumb ring and finger rings permit single-handed operation of the syringe, which is advantageous because often the other hand manipulates an ultrasound probe for visualization of the needle position in the target tissue.

Figure 4:
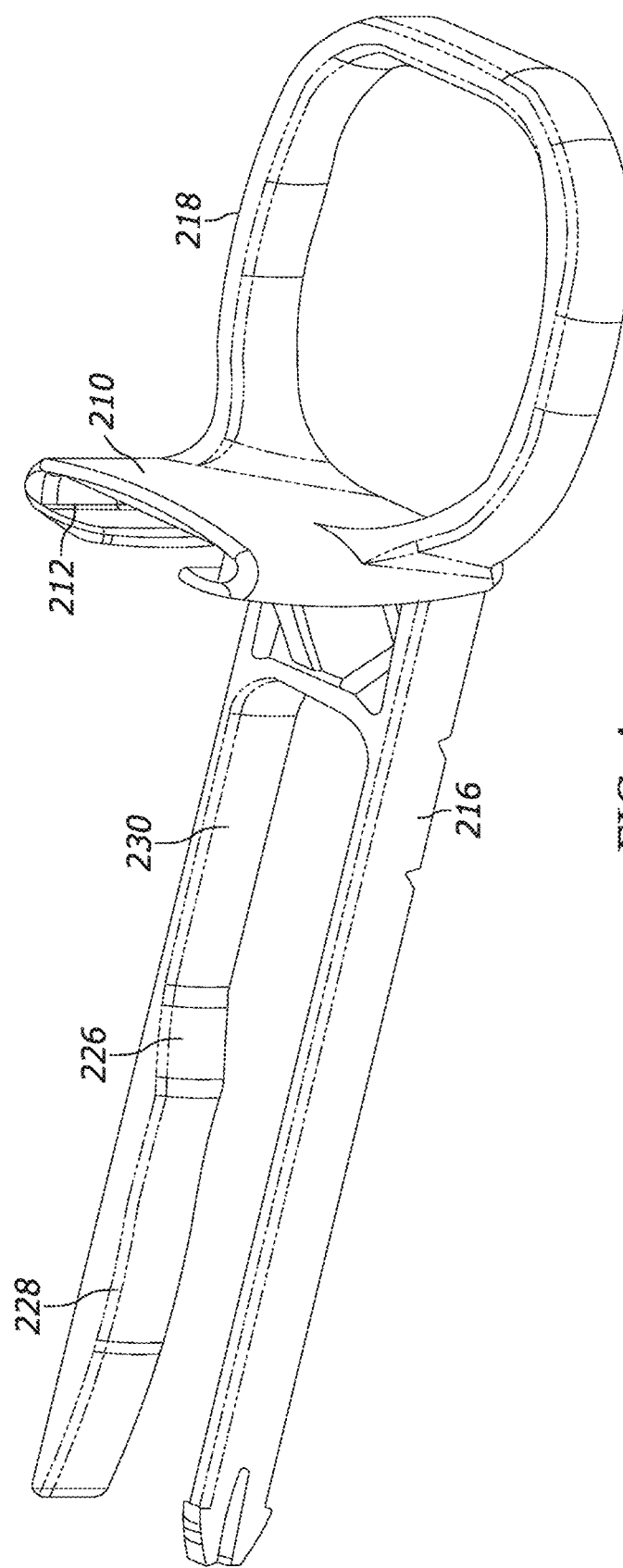
FIG. 4 is a perspective view of the thumb ring and ramp in the embodiment of FIG. 3.
Figure 5:
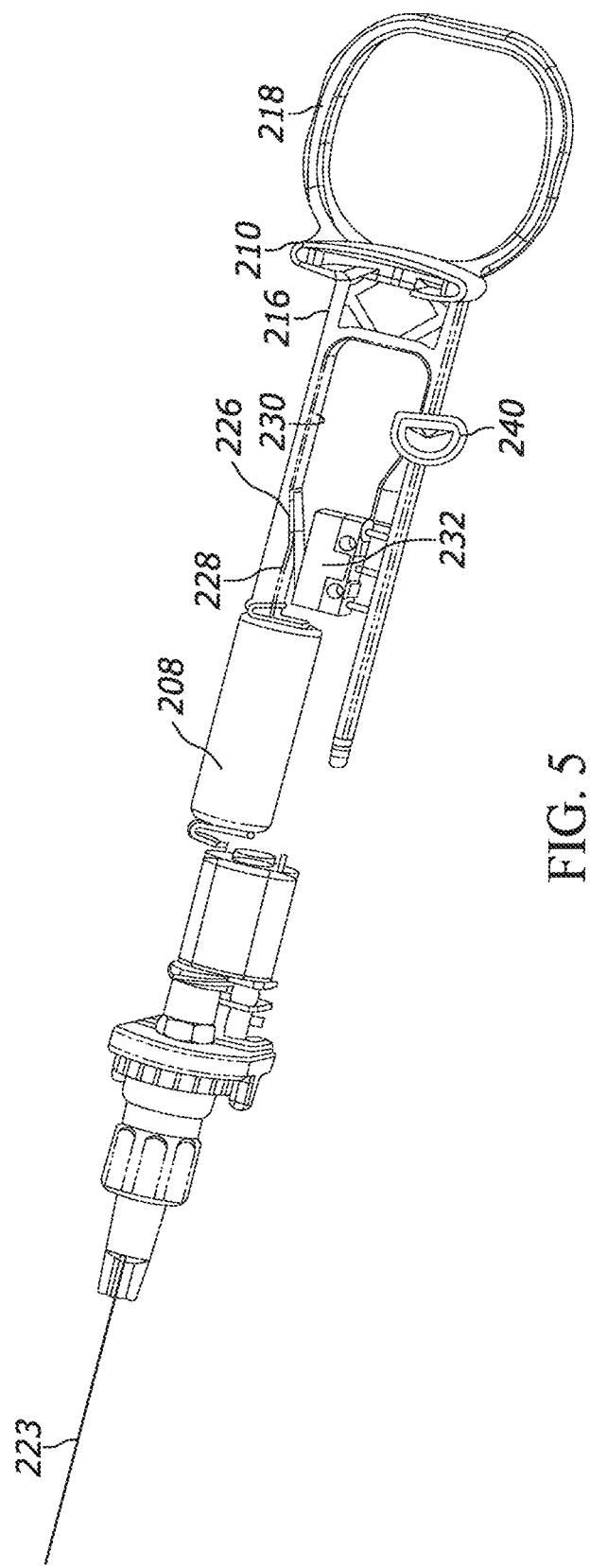
FIG. 5 is a top view of the thumb ring, ramp, and switch of the embodiment of FIG. 3, with the plunger and barrel of the syringe removed for illustration.

As best shown in FIGS. 4 and 5, at least one of the arms 216 includes, on its inner surface, an inclined ramp 226 that extends inwardly from the remainder of the arm 216 to merge with a surface 228 that is generally parallel to and offset inwardly from the proximal segment 230 of the inner surface of the arm 216. The ramp 226 abuts a motor activation switch 232 (FIG. 5) in a first plunger position to activate the motor 208 and does not abut the motor activation switch 232 in a second plunger position to deactivate the motor 208.

With greater particularity, the motor is activated when there is vacuum in the syringe, meaning that the motor is activated by the ramp/switch only in a retracted configuration of the plunger, which causes the ramp 226 to ride against the switch 232 to close the switch 232 and activate the motor. Advantageously the motor is deactivated before any expulsion of captured tissue occurs, i.e., the motor is deactivated when the plunger is advanced fully into the barrel, which causes the ramp 226 to disengage the switch 232 and deenergize the motor.

Figure 6:
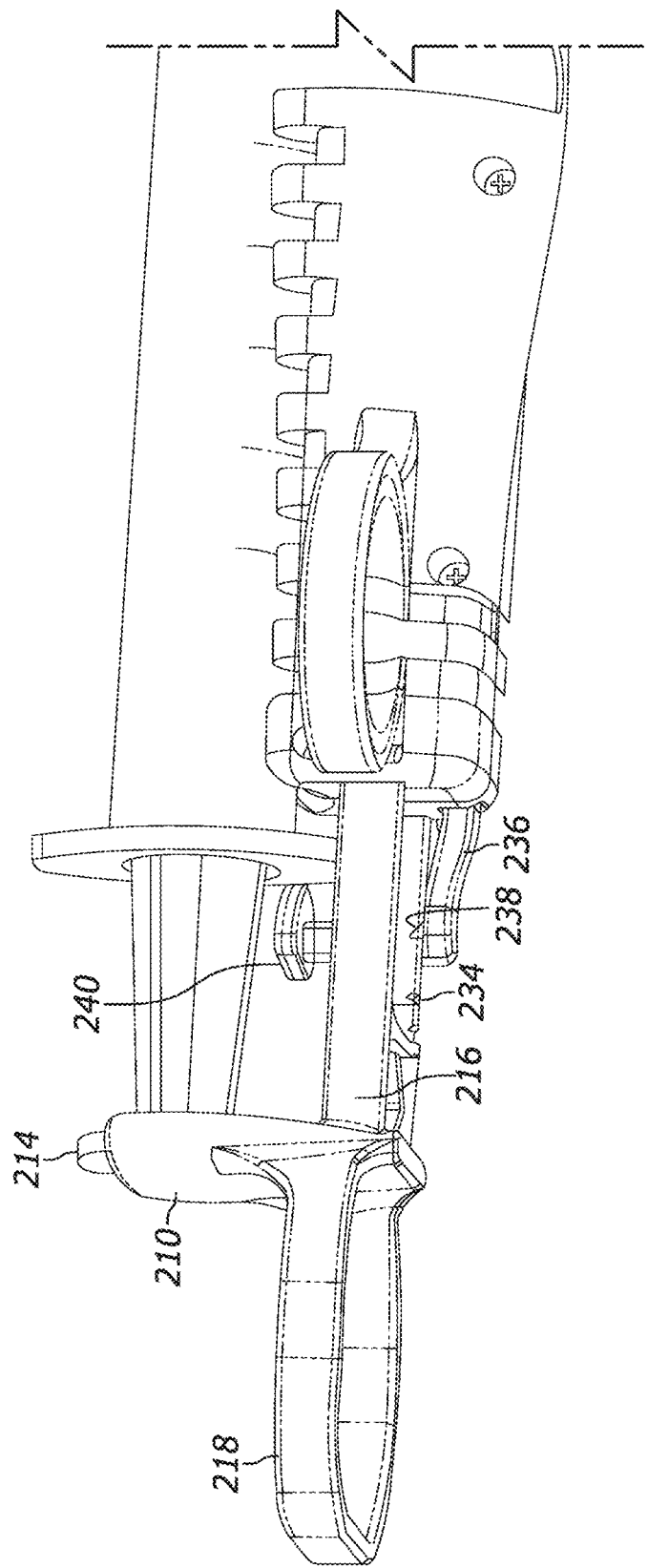
FIG. 6 is a detail perspective view of the proximal portion of the plunger of the embodiment of FIG. 3 showing the detent lock mechanism.

FIG. 6 best shows an additional feature of the device 200 in which one of the arms 216 is formed with one or more notches 234. A detent arm 236 is attached to and extends proximally away from the housing 220, generally parallel to the arm 216. The proximal end of the detent arm 236 is formed with an inwardly protruding bump or detent 238 with an inclined surface that rides on the plunger control arm 216. The detent arm 236 is biased to a first position, in which the detent 238 engages the notch 234 to lock movement of the plunger in the barrel, and is movable to a second position, in which the detent does not engage the notch to unlock movement of the plunger in the barrel. In the example shown, the detent 238 is movable to the second position by a compressible detent button 240 that can be pressed against the detent and/or detent arm to urge the detent 238 out of the notch 234.

At least one of the notches 234 is located at a position in which the plunger is retracted to establish an evacuated space in the barrel 204 of a predetermined volume. In an example, the predetermined volume is two cubic centimeters. One of the other notches 234 may be used for a storage position of the plunger to prevent creepage of the arm 216 (and, hence, plunger 206) during storage, which another of the other notches may be for indicating an end of travel position. The notches 234 and ramped bump or detent 238 may be oriented for one-way action so that the plunger 206 can be retracted without resistance but cannot be advanced distally into the barrel 204 past a notch 234 without depressing the button 240. With particularity, as illustrated in FIG. 6 the ramp surface of the detent 238 increases from a narrow width at the distal end of the detent 238 to a wider width at a proximal wall of the detent 238 that is generally perpendicular to the axis of the syringe.

In operation, after insertion into the target tissue, the plunger 206 can be retracted with the thumb. The internal ramp 228 on the plunger control arm 216 activates the motor switch 232 to energize the motor 208 to rotate the needle and harvest tissue. After harvest, the plunger 206 is advanced partially back into the barrel 204, turning off the motor 208 and continuing travel until the 2 cc notch 234 engages the detent 238. The needle is then removed from the patient and the contents of the syringe 202 can be expelled onto a glass slide by pushing the button 240 to release the detent 238 from the notch 234 and fully advancing the plunger 206 into the barrel 204.

Figure 7:
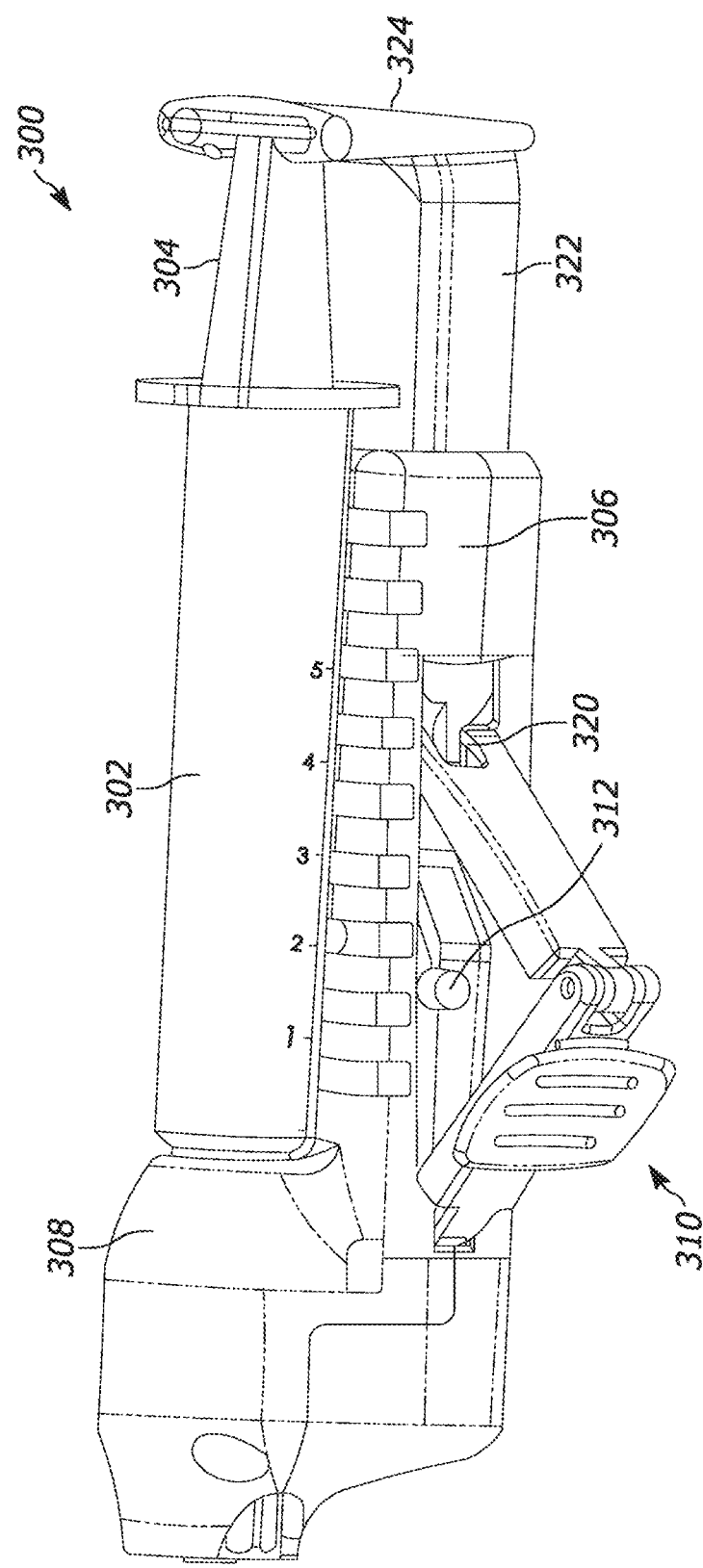
FIG. 7 is a perspective view of an alternate embodiment of a needle assembly in the partially retracted configuration, in which a scissor-type linkage permits one-handed plunger control, and the motor is activated by the linkage being manually collapsed against a motor switch in an extended configuration, omitting the needle and certain other components at the distal end for clarity.

Now referring to FIGS. 7-11, a second one-handed operation syringe 300 is shown that also automatically activates and deactivates the motor based on plunger position. The syringe 300 includes a barrel 302 and a plunger 304 slidably disposed in the barrel and movable to evacuate the tissue chamber of the needle (which is removed in FIGS. 7-11 for clarity). As was the case in FIGS. 3-6, the syringe 700 of FIG. 7 is disposed in a semi-cylindrical trough of a housing 306 with the distal portion of the syringe extending through a gear enclosure 308 of the housing 306. The housing 306 contains the below-described motor and motor-related activation components.

Figure 8:
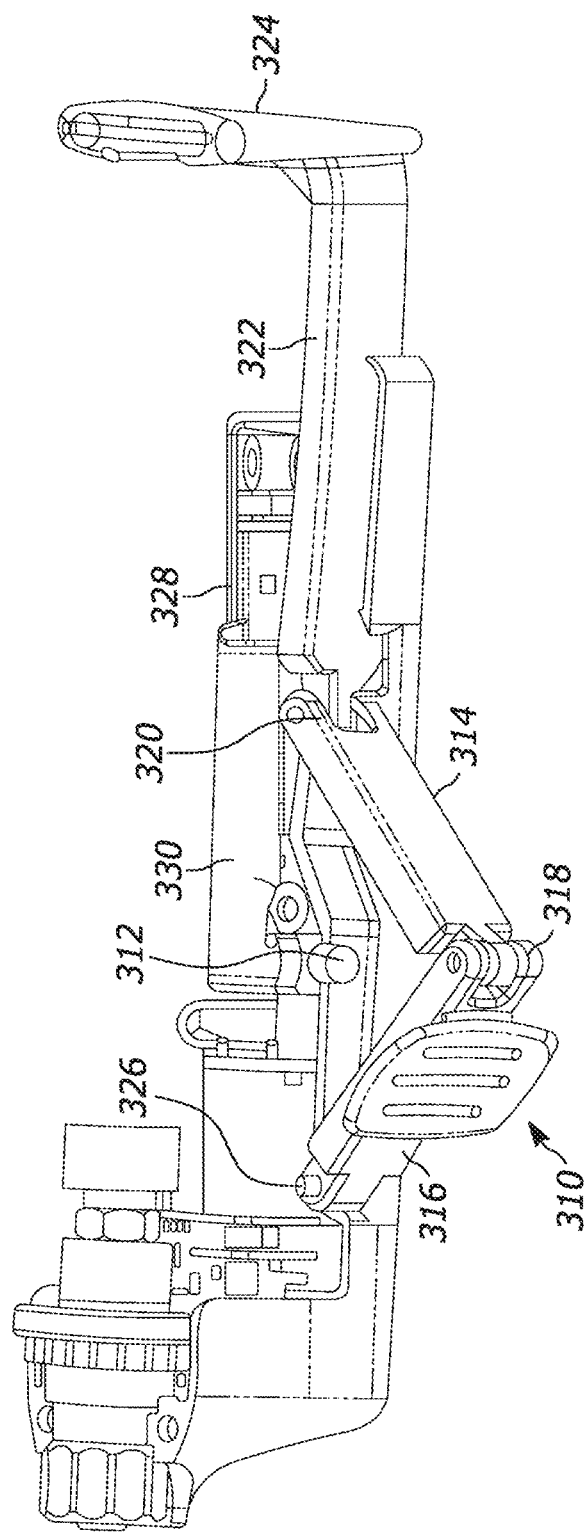
FIG. 8 is a perspective view of the scissor linkage shown in FIG. 7.
Figure 9:
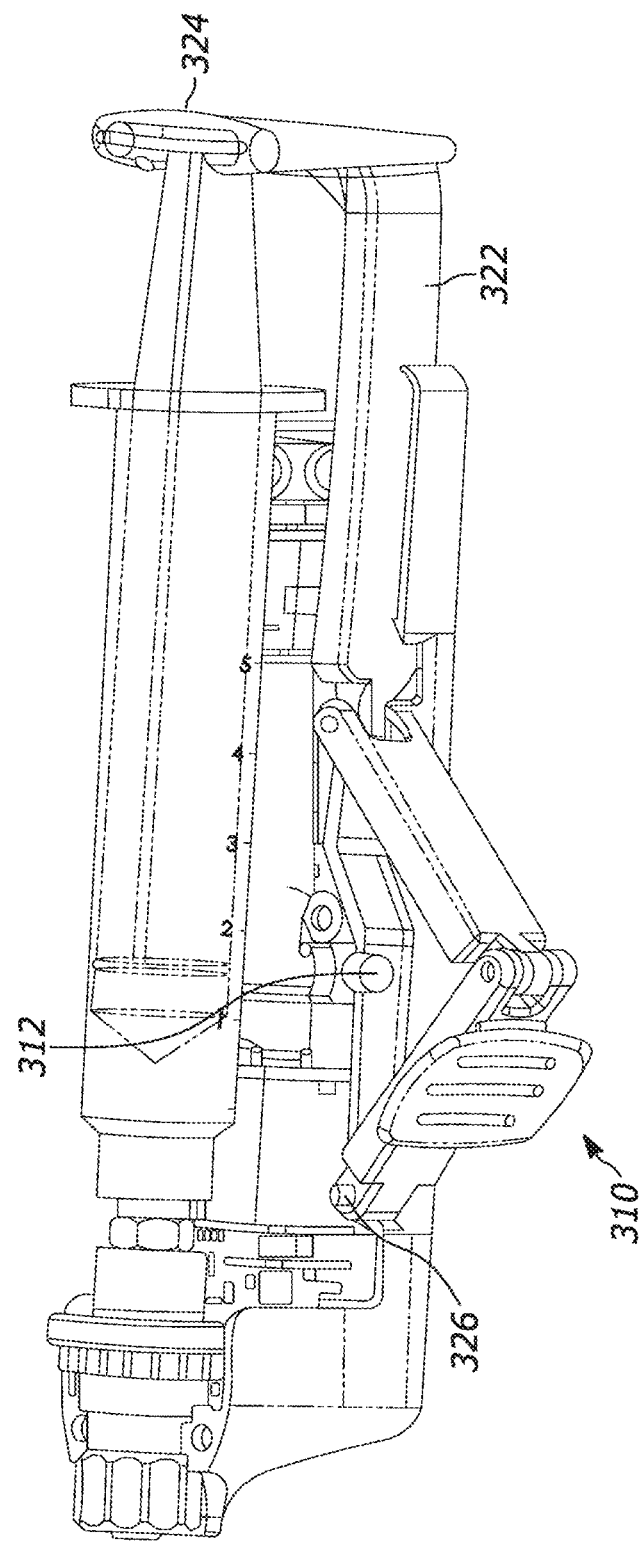
FIG. 9 is a perspective view of the scissor linkage and syringe of FIG. 7 with portions removed to reveal internal components.
Figure 10:
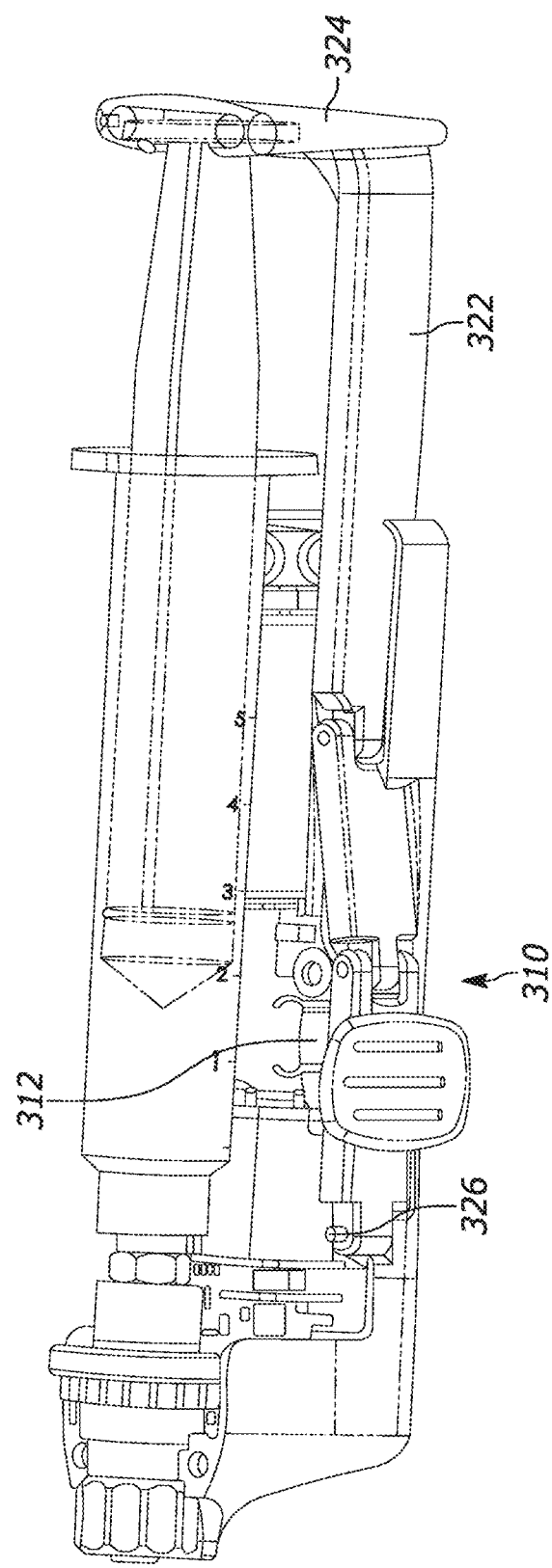
FIG. 10 is a perspective view of the assembly of FIG. 7 in the fully retracted (collapsed) configuration.
Figure 11:
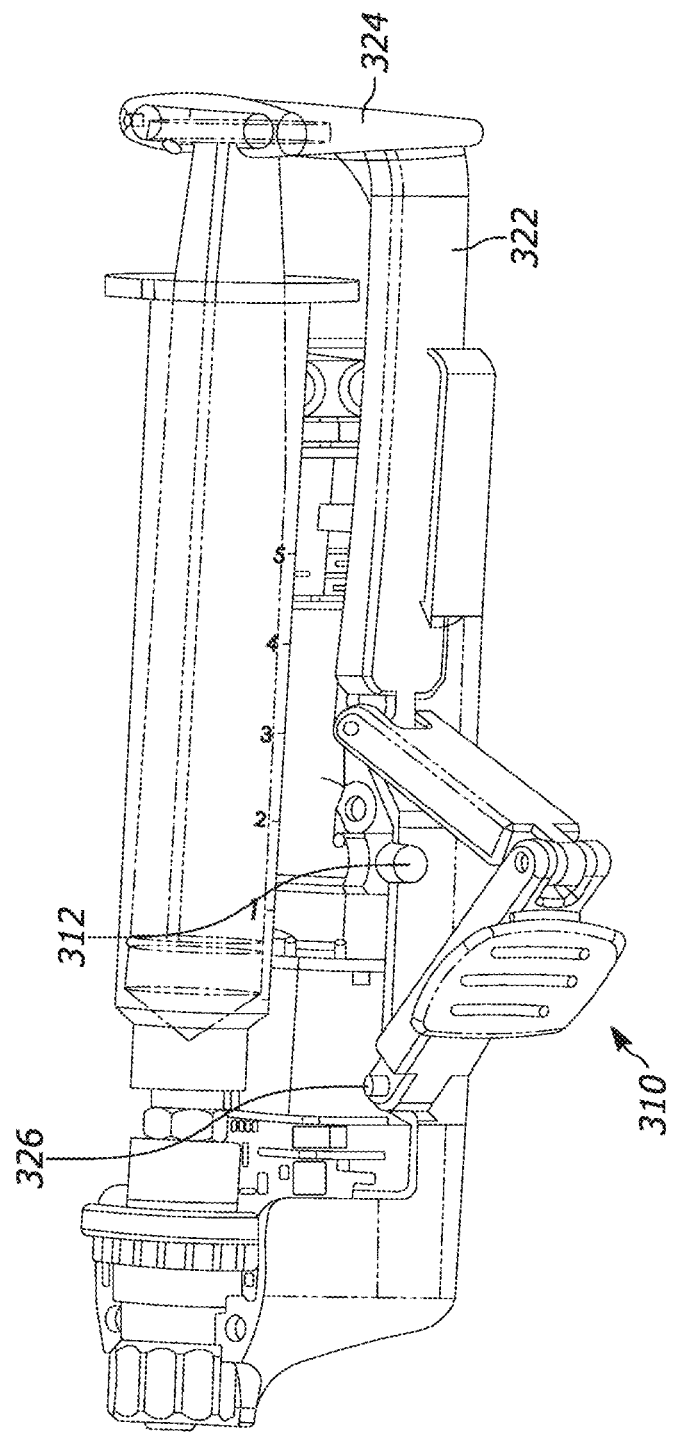
FIG. 11 is a perspective view of the assembly of FIG. 7 in the fully inserted configuration.

A linkage 310 is coupled to the housing 306 and is movable between a first configuration illustrated in FIG. 11, in which the linkage is V-shaped and is distanced from a motor switch 312 to deactivate the motor, through intermediate configurations shown in FIGS. 7-9, to a second configuration shown in FIG. 10, in which the linkage 310 is substantially straight and urges inwardly against the motor switch 312 to energize the motor.

The linkage 310, as best shown in FIG. 8, includes proximal and distal segments 314, 316 rotatably coupled together at a link hinge 318 located between the segments 314, 316. The proximal end of the proximal segment 314 is rotatably coupled at a plunger activation hinge 320 to an elongated plunger activation arm 322 which is oriented parallel to the axis of the syringe 300. The plunger activation arm 322 is attached to or made integrally with a plunger flange receptacle 324 at its proximal end as shown which, like the embodiment in FIGS. 3-6, holds the proximal flange of the plunger. The linkage 310 can both hinge and move translationally along the axis of the syringe 300.

On the other hand, the distal end of the distal segment 316 of the linkage 310 is rotatably coupled to the plunger activation arm by a distal pivot pin 326 (FIGS. 8-11) that permits rotation motion of the linkage 310 relative to the plunger activation arm 322 but which holds the distal end of the distal segment 316 translationally stationary with respect to the plunger activation arm 322. FIG. 8 also shows a control board 328 for causing the motor, shown at 330 in FIG. 8, to oscillate.

With the above structure in mind, instead of a thumb pulling the syringe proximally as for the embodiment in FIGS. 3-6, in the embodiment of FIGS. 7-11 the plunger 304 is retracted by squeezing the linkage 310 against the housing 308 with the assembly being held between thumb and forefinger similar to holding a pencil in either the left or right hand. Initially, using the squeezing motion, the plunger 304 is manually pulled back to the configuration shown in FIG. 9 to leave a predetermined volume in the barrel distal to the distal end of the plunger (such as, e.g., 2 cc). The needle is then inserted into the tissue for harvest. Further squeezing motion retracts the plunger 304 proximally in the barrel 302 while flattening the linkage 310 against the motor switch 312, activating the motor 330 during maximum vacuum in the barrel 302 shown in FIG. 10. The spinning needle serves to harvest tissue. Release of the squeeze pressure allows the vacuum inside the syringe to move the plunger 304 distally in the barrel to the position shown in FIG. 9, with about one cc volume in the barrel 302 distal to the distal end of the plunger 304. This releases the motor switch 312 and deenergizes the motor 330. After the needle is removed from the patient, contents can be expelled onto the slide manually by urging on the receptacle 324 to advance the plunger 304 fully into the barrel 302.

With the above in mind, a medical professional can use either of the embodiments shown n FIGS. 3-11 to retract a syringe plunger proximally relative to a barrel of the syringe to a first proximal position, advance a needle in fluid communication with the barrel of the syringe into an object to be sampled, and energize a motor coupled to the needle to rotate the needle before or after advancing the needle into the patient. As will be discussed further below, the direction of rotation of the motor is reversed to reverse the direction of rotation of the needle during harvesting. Also, the plunger can be retracted to a second position to cause portions of the object to be sucked into the needle as the needle rotates. The direction of rotation of the motor can alternate such that the needle oscillates. The motor is deenergized, the plunger released from the second position and the needle withdrawn from the object, and the plunger advanced distally to expel the portions of the object from the needle onto, e.g., an analysis slide.

Figure 12:
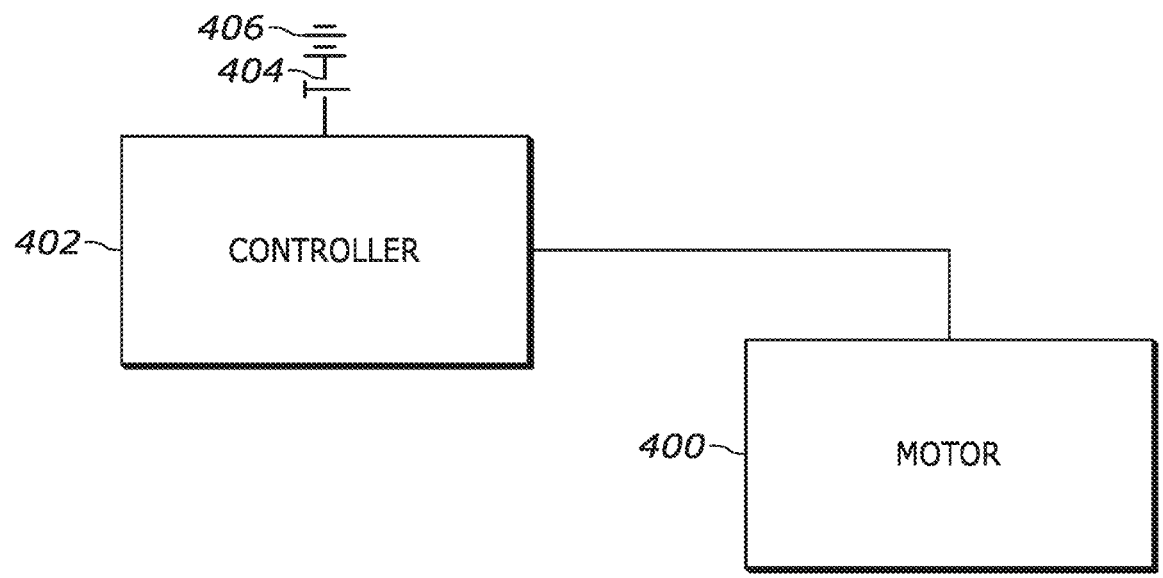
FIG. 12 is a block diagram of a first motor control circuit in which oscillation of the motor is effected by timing.

Now referring to FIG. 12, a motor 400 such as any of the motors described herein is electrically coupled to a controller 402. A motor switch 404 such as any of the motor switches described herein can be operated according to principles discussed above to electrically couple the controller 402 to one or more batteries 406.

Figure 13:
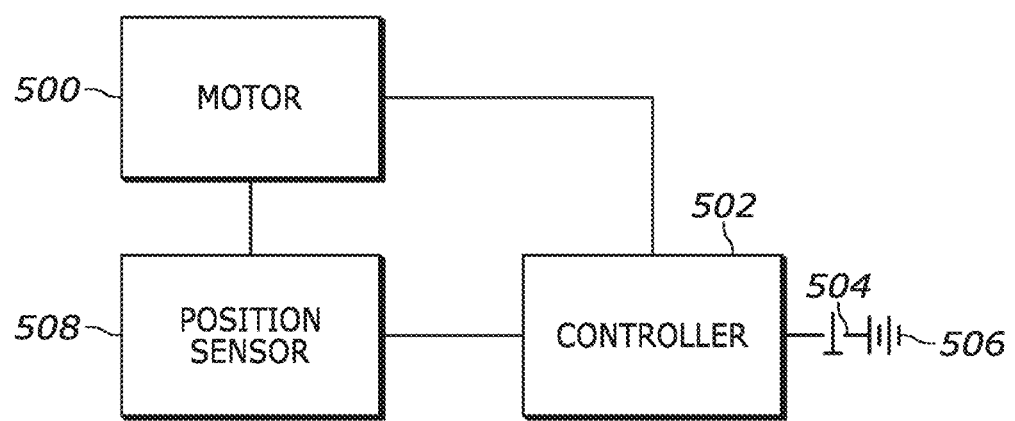
FIG. 13 is a block diagram of a first motor control circuit in which oscillation of the motor is effected by a motor position sensor.

FIG. 13 illustrates an alternate embodiment in which a motor 500 such as any of the motors described herein is electrically coupled to a controller 502. A motor switch 504 such as any of the motor switches described herein can be operated according to principles discussed above to electrically couple the controller 502 to one or more batteries 506. A position sensor 508 such as but not limited to a Hall sensor outputs a signal representative of an angular position of the rotor of the motor 500 and sends the signal to the controller 502.

Figure 14:
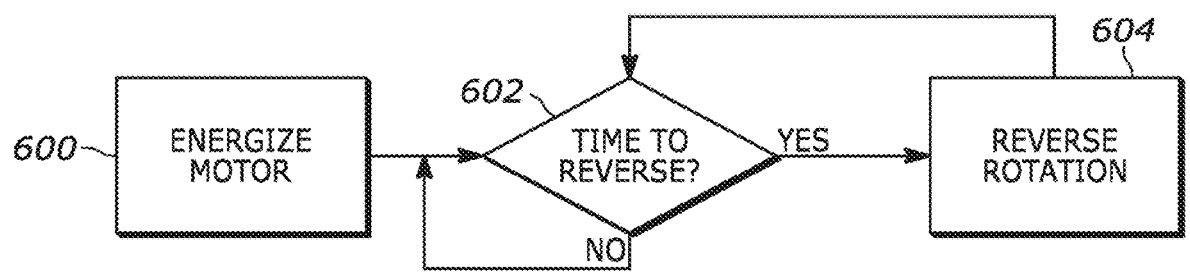
FIG. 14 is a flow chart of logic implemented by the circuit of FIG. 12.
Figure 15:
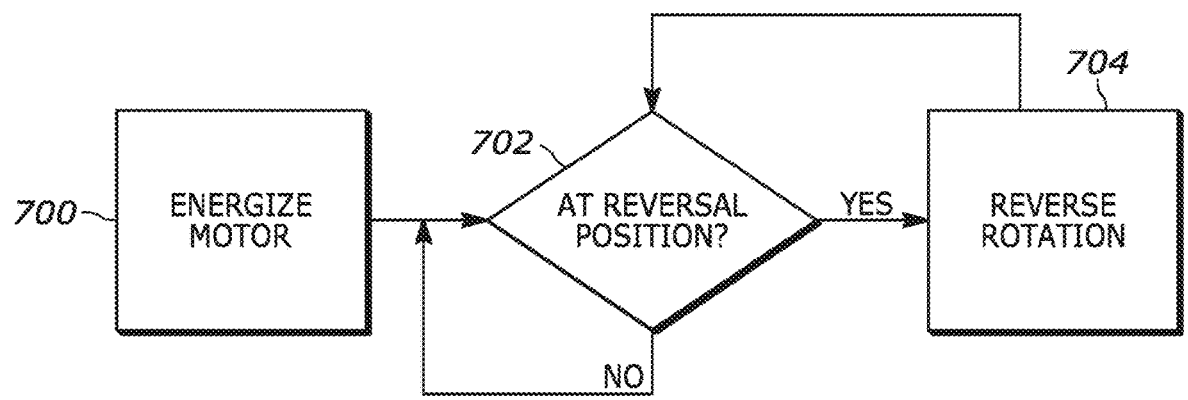
FIG. 15 is a flow chart of logic implemented by the circuit of FIG. 13.

FIG. 14 illustrates logic embodied in the controller 402 of FIG. 11 while FIG. 15 illustrates logic embodied in the controller 502 in FIG. 12. Commencing at state 600, the motor is energized. When a time period is determined to have elapsed at state 602, the direction of rotation of the rotor of the motor is reversed at state 604. The logic loops back to state 602 to continue to reverse the direction of rotation at various time periods, which may be predetermined in some embodiments, until the motor is deenergized, to cause the motor to oscillate during energization.

When a position sensor 508 is implemented as shown in FIG. 13, the logic of FIG. 15 may be employed by the controller. The motor is energized at block 700, and upon determination at state 702 based on the signal from the position sensor that a position of the motor has been attained, the direction of rotation of the motor is reversed at state 704. Note that the position at which rotation is reversed may be multiples of a particular angle so that the motor is reversed after one or multiple rotations. For example, the rotor position for reversal may be at 0 degrees, 720 degrees (two full rotations), then again at 1440 degrees (after another two full rotations), etc. Or, the rotor position for reversal may be every 180 degrees, i.e., less than a complete rotor rotation. The logic loops back from state 704 to state 702 to continue to reverse the direction of rotation until the motor is deenergized to cause the motor to oscillate during energization.

Any of the motors herein may be electric as described or may use mechanical motive forces such as rubber bands or spring.

Figure 16:
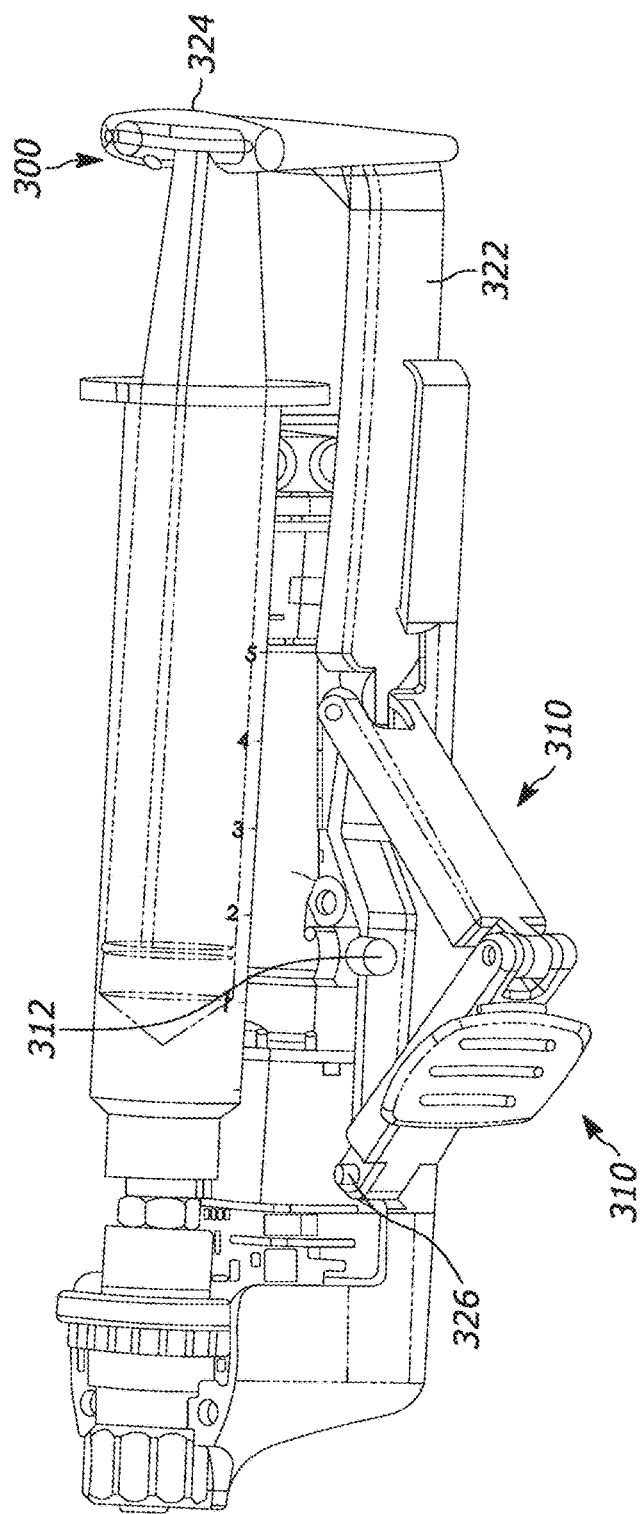
FIG. 16 is a perspective view of an embodiment having a non-electric tension assembly to rotate the needle.
Figure 16:
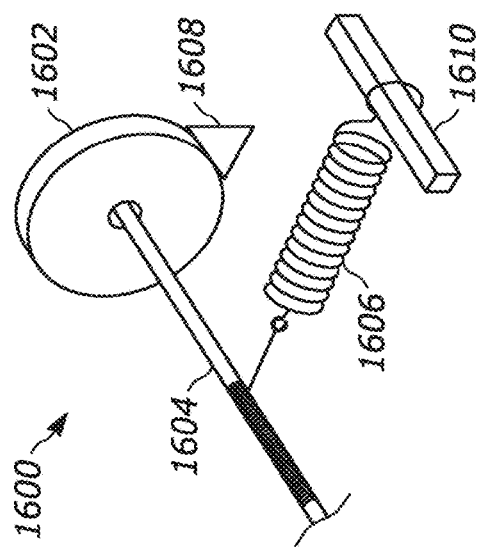
Figure 17:
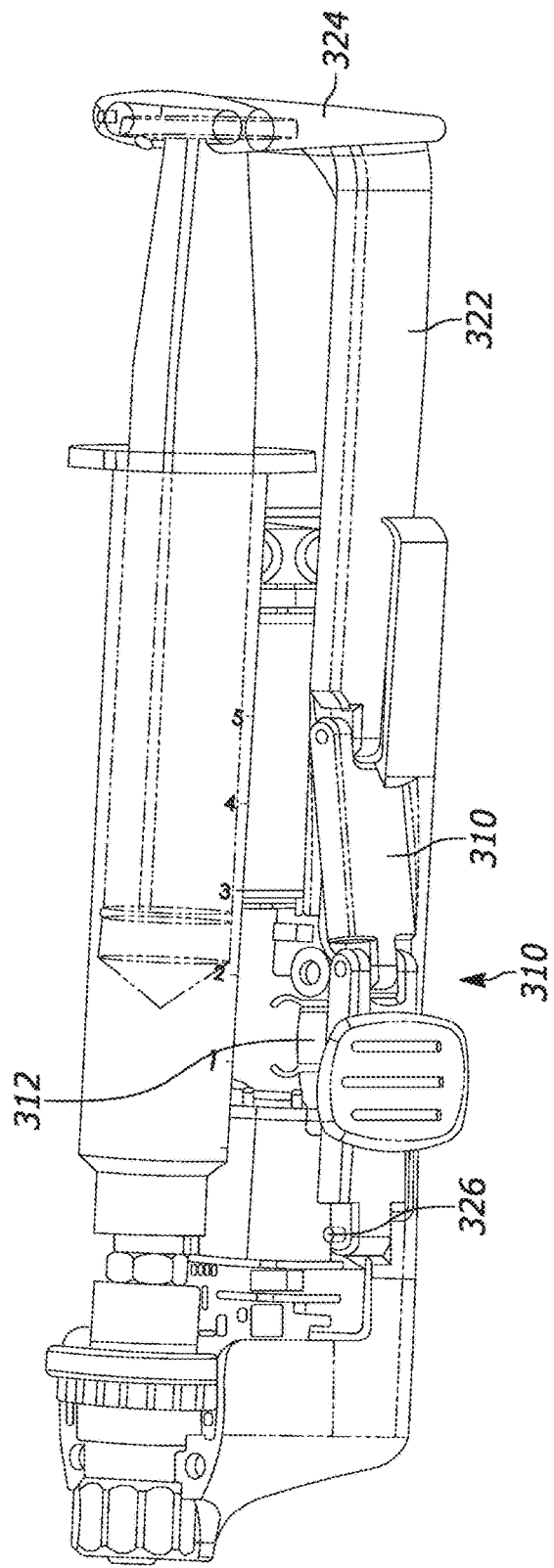
FIG. 17 is a perspective view of an embodiment having a non-electric tension assembly to rotate the needle illustrating the assembly under tension.
Figure 17:
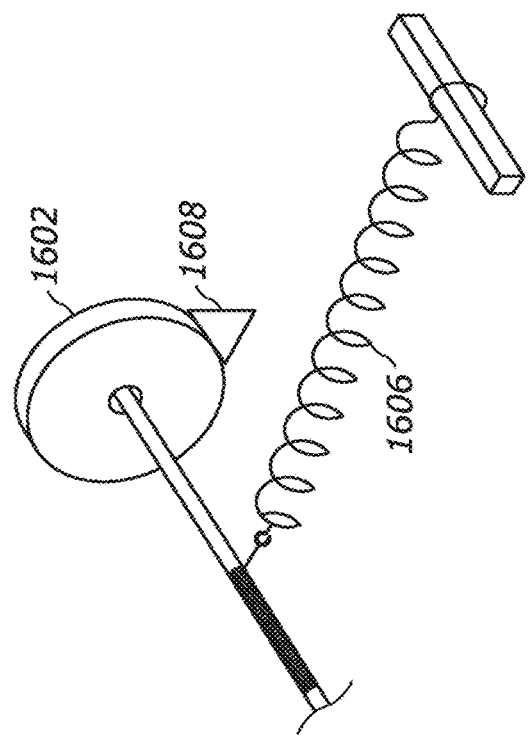
Figure 18:
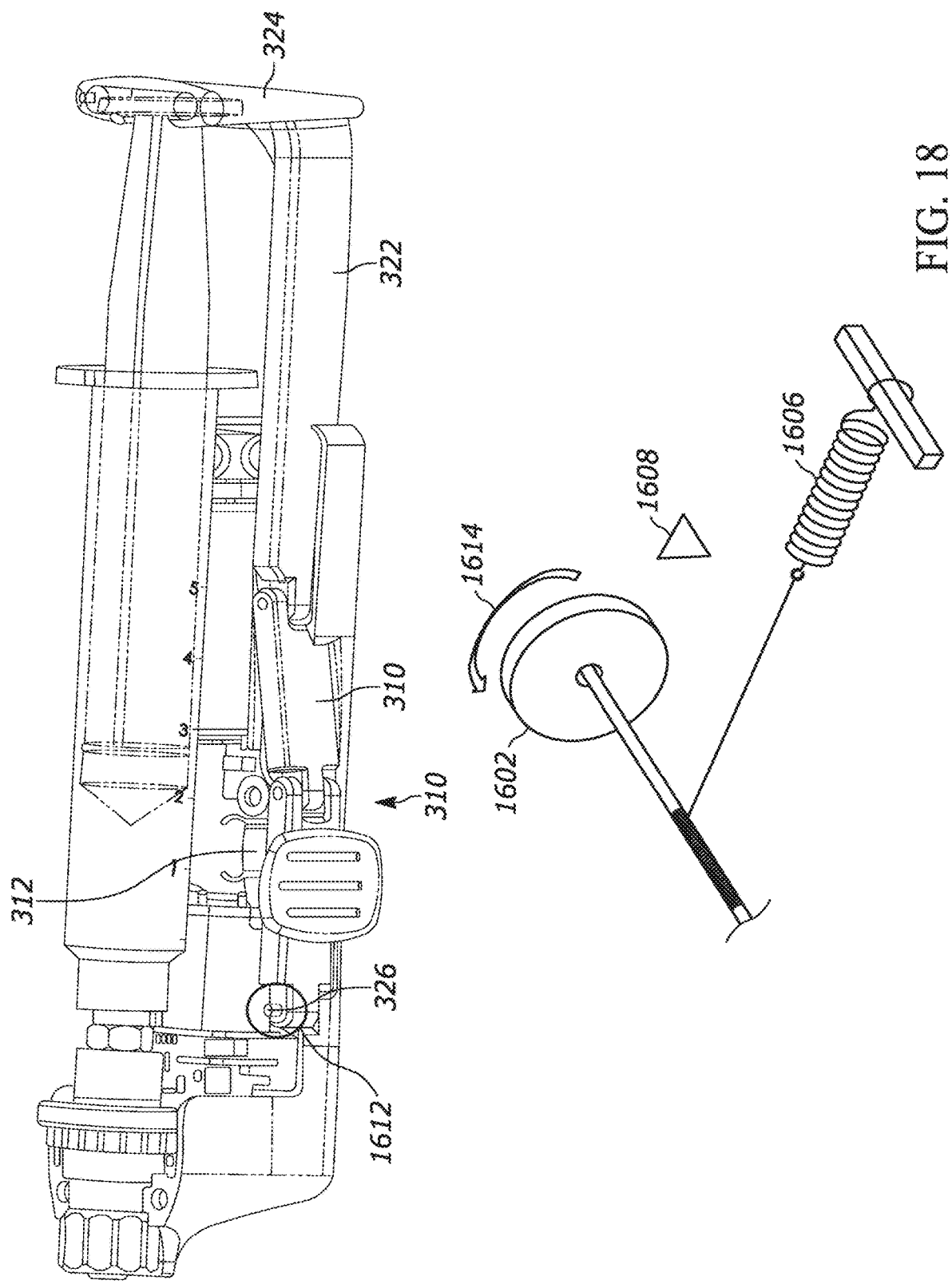
FIG. 18 is a perspective view of an embodiment having a non-electric tension assembly configured to rotate the needle illustrating the relative movement of the components.
Figure 19:
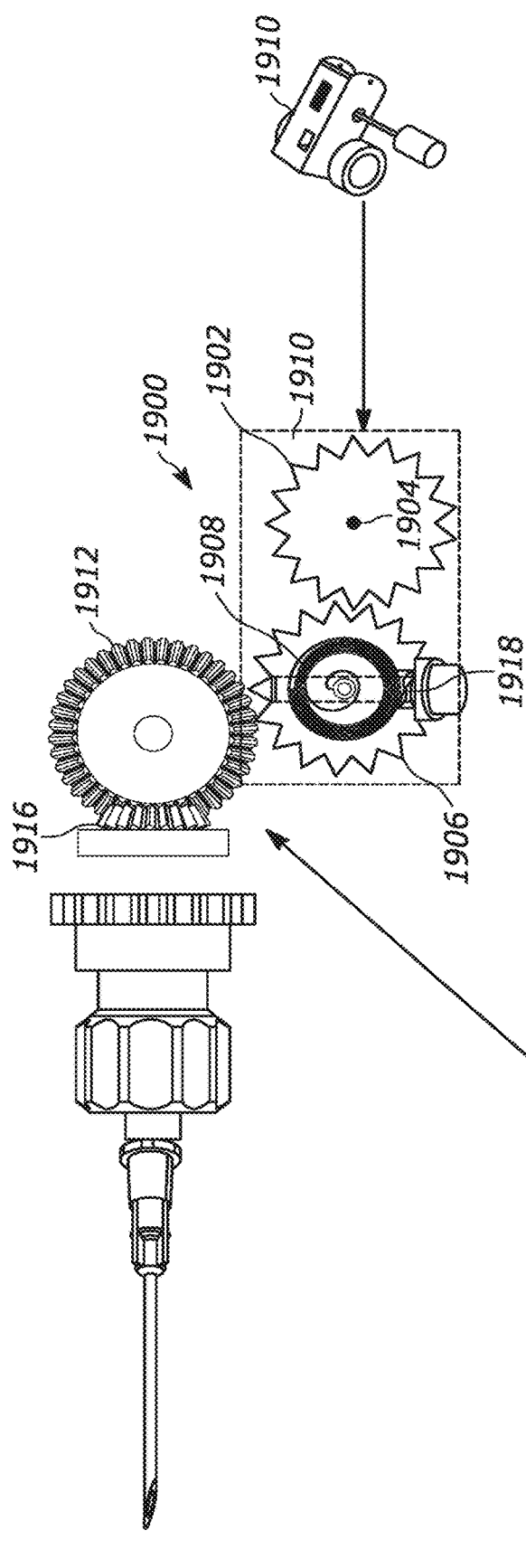
FIG. 19 is an exploded view of an embodiment of the non-electric tension assembly.
Figure 20:
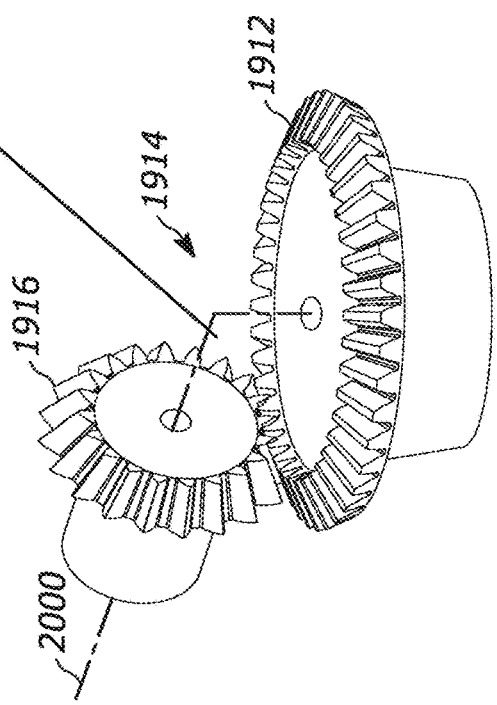
FIG. 20 illustrates an embodiment of a non-electric tension assembly to rotate the needle.

FIGS. 16-18 illustrate a first non-electric needle rotation mechanism 1600 and FIGS. 19 and 20 illustrate a second non-electric needle rotation mechanism 1900 that may be used in place of the electric motors in the device 200 shown in FIG. 2 or the one-handed operation syringe 300 shown in FIG. 7 or other needle/syringe systems. The mechanisms 1600, 1900 are tension-based mechanisms that are tensioned by operation of the plunger activation mechanism of the syringe and then released to rotate, as tension relaxes, the needle of the device.

FIGS. 16-19 illustrate, by way of example, the syringe 300 shown in FIG. 7, except that in place of the electric motor, a tension-based needle rotation mechanism 1600 includes a gear 1602 that is coupled to the needle to rotate the needle. It is to be understood however that the device 200 of FIG. 3 also may use the tension-based needle rotation mechanisms herein.

The gear 1602 turns on an axle 1604 to which a spring 1606 such as a coil spring, rubber band, or other stretchable mechanism that releases tension is attached. The axle 1604 is coupled to the plunger activation mechanism to rotate as the plunger activation mechanism is operated by the surgeon. A brake 1608 can selectively engage the gear 1602 to prevent the gear 1602 from rotating at the end of axle travel. The brake 1608 may be implemented by a reciprocating pawl that can engage and disengage the teeth of the gear 1602. The spring is held at its end opposite to the axle 1604 by a support 1610 in the syringe structure.

When the linkage 310 is squeezed from the configuration of FIGS. 11 and 16 (V-shaped) to the flat configuration shown in FIGS. 10 and 17 to move the plunger of the syringe, the axle 1604 rotates the gear 1602 and tensions the spring 1606. At the end of travel the brake 1608 holds the gear 1602, maintaining the spring tensioned (FIG. 17).

When it is desired to rotate the needle, a button 1612 or other release mechanism on the syringe 300 that is coupled to the brake 1608 releases the brake 1608 from the gear 1602, allowing the spring to de-tension to rotate the gear 1602 (and, hence, the needle) as indicated by the arc 1614 in FIG. 18.

FIGS. 19 and 20 illustrate an alternate tension-based needle rotation mechanism 1900 in which a drive gear 1902 rotates on an axle 1904 that is coupled to the plunger activation mechanism to rotate as the plunger activation mechanism is manipulated by the surgeon to move the plunger. The drive gear 1902 is meshed with a spring gear 1906 to rotate the spring gear 1906 against the tension provided by a coil spring 1908 that is coupled to the spring gear 1906. The drive gear 1902 and spring gear 1906 may be disposed in a wind-up gearbox 1910.

In turn, the spring gear 1906 is meshed with a transfer gear 1912 of a 90° gear assembly 1914 (FIG. 20). The transfer gear 1912 is meshed with a needle drive gear 1916 of the 90° gear assembly 1914 to transfer rotational motion of the transfer gear 1912 90° to the needle drive gear 1916.

It may now be appreciated that as the plunger activation assembly is actuated to move the plunger, the gear train shown in FIG. 19 is actuated to tension the spring 1908, with the spring gear being stopped from rotation at the end of travel by a brake 1918 that may be implemented by a pawl. The brake 1918 can be released using the button 1920 to allow the spring gear to de-tension, rotating the 90° gear assembly 1914 shown in FIG. 20 to rotate a needle 2000 that is engaged with the 90° gear assembly 1914.

Figure 20A:
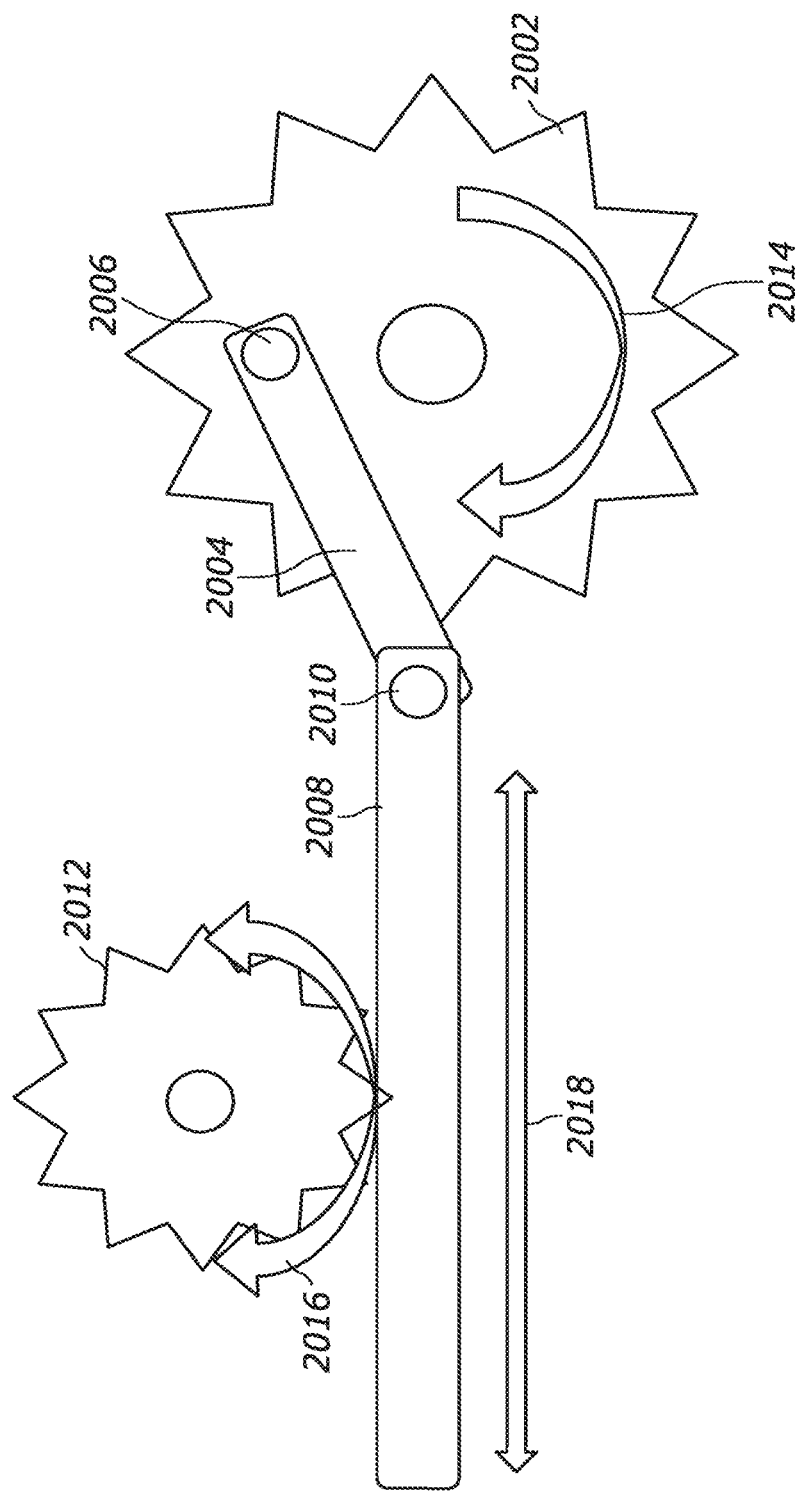
FIG. 20A illustrates a crank mechanism that can be used with either of the non-electric tension assemblies shown herein to provide for oscillating (back-and-forth) rotation of the needle.

FIG. 20A illustrates a crank-and-rod mechanism that may be used to effect back-and-forth (oscillating) rotation of the needle. The mechanism may be inserted at any appropriate point in the gear train. For example, the gear 1602 in FIGS. 16-18 or the needle drive gear 1916 in FIG. 19 may be represented by a drive gear 2002 in FIG. 20A. An elongated shaft-like crank 2004 is pivotably attached to the gear 2002 at a pivot joint 2006 on one end of the crank and on the other end of the crank, the crank 2004 is pivotably attached to an elongated shaft-like rod 2008 at a pivot joint 2010. The rod 2008 may be formed as a toothed rack that is meshed with a pinion 2012 that in turn is coupled to the needle of the device. As the drive gear 2002 rotates in a single direction as indicated by the arrow 2014, the rotational motion is translated by the crank and rod to reciprocating axial motion of the rod 2008 as indicated by the arrow 2016, which in turn causes oscillating rotational motion of the pinion 2012 and, hence, needle as indicated by the arrow 2018.

Figure 22:
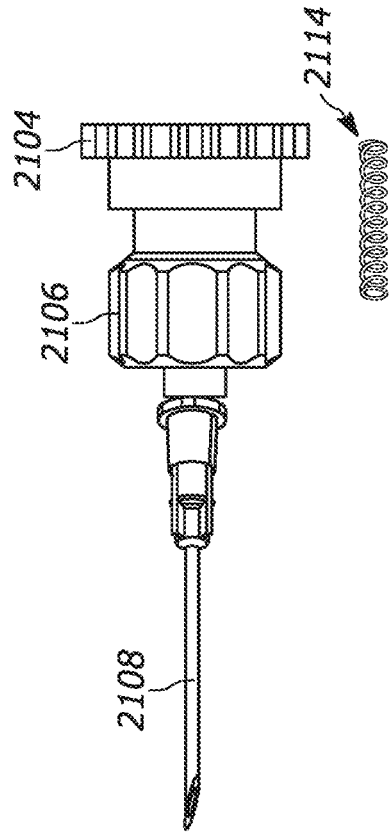
FIG. 22 depicts a partial exploded view of an embodiment of an axial oscillation mechanism and the needle.
Figure 21:
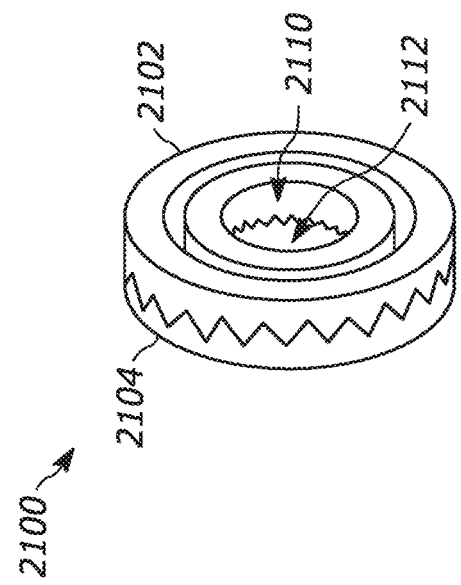
FIG. 21 depicts an embodiment of a gear assembly for an axial oscillation mechanism for the needle.
Figure 23:
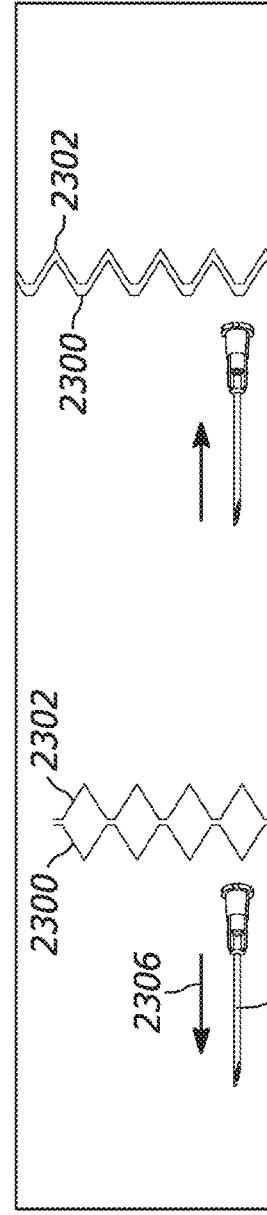
FIG. 23 is a diagram illustrating the axial oscillation of the needle as the gear assembly rotates.

FIGS. 21-23 illustrate a Hirth gear assembly 2100 for causing, in addition to oscillating motion of any of the needles described herein about its axis, axial oscillating motion of the needle.

As shown, an outer drive gear 2102 such as any of the motor-driven (electric or tensioned) drive gears described herein is meshed in Hirth-fashion with an outer needle gear 2104 to translate rotational motion including rotational oscillating motion to a needle assembly 2106 from which a needle 2108 such as any of the needles described herein extends. Concentric with the outer drive gear 2102 is a fixed inner gear 2110 that is fixedly coupled to the assembly 2100 such that the fixed gear 2110 cannot rotate.

As shown in FIG. 21, the inner fixed gear 2110 is meshed in Hirth-fashion with an inner needle gear 2112 that is concentric with the outer needle gear 2104 and that is coupled to a portion of the needle assembly 2106 that rotates under the influence of the outer needle gear 2104. In this way, the inner needle gear 2112 rotates with the outer needle gear 2104. A spring 2114 may be disposed in compression between structure of the needle assembly 2106 and the one or both needle gears 2104, 2112 to urge the needle gears against the respective drive gear/fixed gear.

As best illustrated in FIG. 23, as the drive gear 2102 rotates the inner and outer needle gears, the teeth 2300 of the inner needle gear 2112 ride against and rotate past the teeth 2302 of the stationary inner gear 2110. As the teeth of the two gears move from alignment (meshed) toward misalignment as shown at 2304 in FIG. 23, the needle 2108 moves axially outward as indicated by the arrow 2306. As the teeth 2300 of the inner needle gear 2112 continue to rotate against the stationary teeth 2302 of the inner fixed gear 2110, the gears move toward the meshed configuration shown at 2308 in FIG. 23, causing the needle to move axially inward as indicated by the arrow 2310. In this way the needle oscillates axially along the axis of the device inward and outward as the motor rotates the drive gear 2102.

Figure 24:
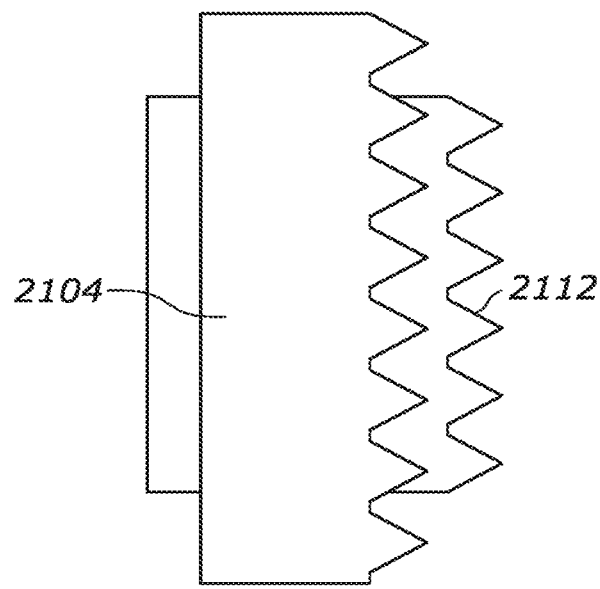
FIG. 24 depicts an embodiment of a gear assembly for an axial oscillation mechanism for the needle.
Figure 25:
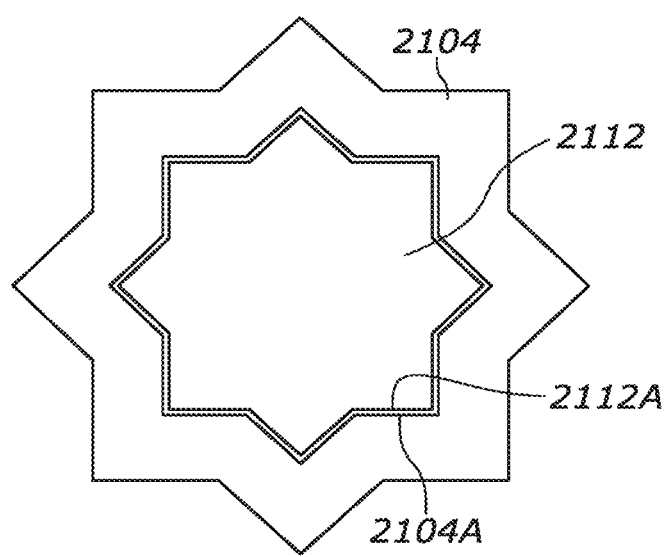
FIG. 25 depicts an embodiment of a gear assembly for an axial oscillation mechanism for the needle.

FIGS. 24-27 provide additional illustration. FIG. 24 is a side view of the outer needle gear 2106 and inner needle gear 2112 and FIG. 25 is a transverse view of the same gears. While the teeth of the inner needle gear 2112 are shown to be triangular, they may be curvilinear (as may the teeth of the fixed gear 2110) to promote smoother wave-like axial reciprocation of the needle. As can best be appreciated in reference to FIG. 25, the inner needle gear 2112 can slide axially within the outer needle gear 2104, with the outer periphery 2112A of the inner needle gear 2112 being polygonal and being complementarily matched to the inner periphery 2104A of the outer needle gear 2104 as shown.

Figure 26:
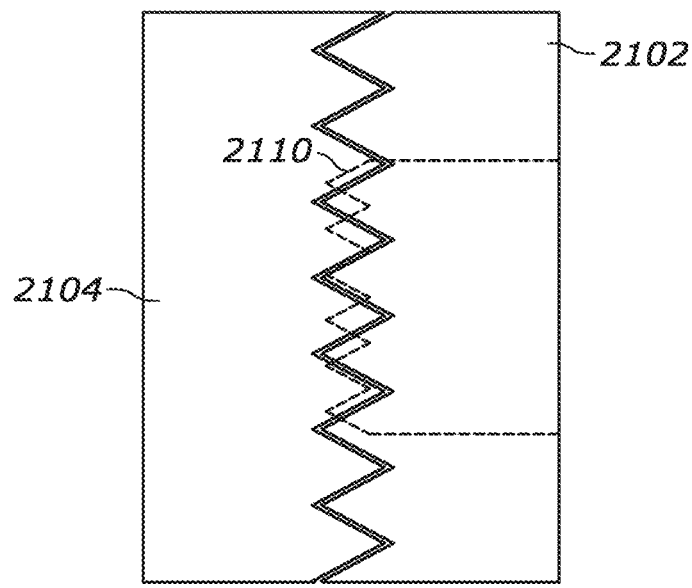
FIG. 26 depicts an embodiment of a gear assembly for an axial oscillation mechanism for the needle.
Figure 27:
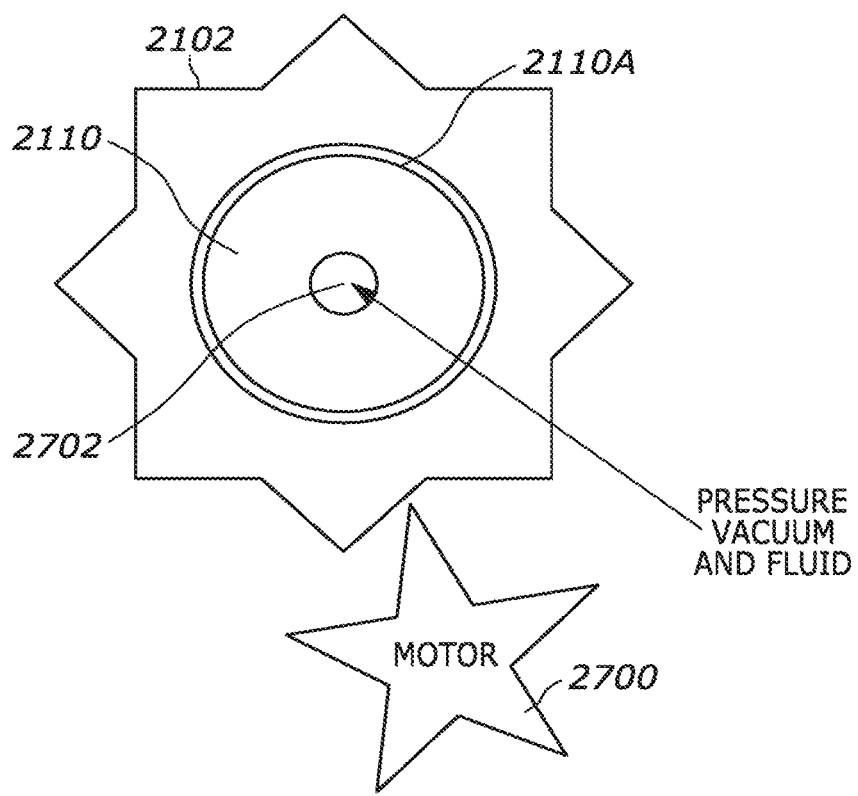
FIG. 27 illustrates an axial oscillation mechanism for the needle.
Figure 28:
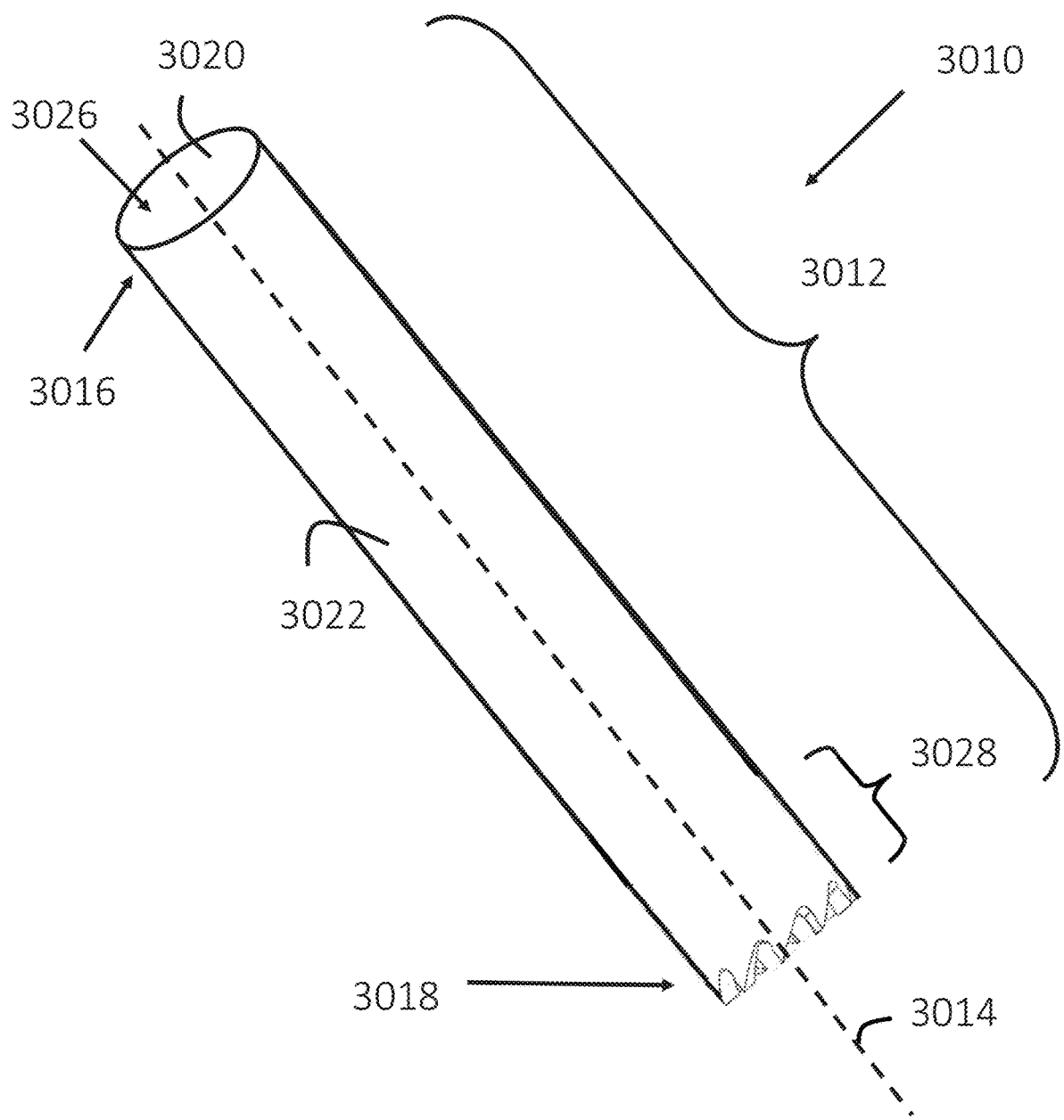
FIG. 28 is a perspective view of an embodiment of a biopsy needle used for the collection of cellular materials within a biopsy area.

FIG. 26 is a side view showing the outer needle gear 2104 being meshed with the outer drive gear 2102. The fixed gear 2110 also is shown. FIG. 27 is a transverse view that illustrates the outer periphery 2110A of the fixed gear 2110 is round so that the drive gear 2102 can rotate about the fixed gear 2110 as a motor shaft 2700 drives the drive gear 2102. A hollow central passageway 2702 may be axially formed through the gears as shown to provide a path for fluid and vacuum communication to the needle.

Some embodiments of the present invention include a biopsy needle that dramatically increases cellular material (i.e., cells) yield per pass. By collecting more cellular material per pass, the biopsy procedure requires fewer passes and is completed in shorter periods of time over conventional biopsy needles. The embodiments disclosed in FIGS. 28-42 may be used in combination with any of the biopsy devices disclosed herein.

Referring now to FIGS. 28-42, biopsy needle 3010 is configured to penetrate one or more layers of tissues to obtain a sample of cellular material (such as cells or fluids) from within a target biopsy area. The cellular material is then analyzed to diagnose a medical condition or to rule out a disease. Biopsy needle 3010 is typically constructed of medical grade stainless nitinol, steel, or carbon steel; however, it is appreciated that biopsy needle 3010 may be constructed from other metals, polymers, carbon fiber, plastics, resins, composites, or any other biocompatible materials, which are pharmacologically inert.

Generally, biopsy needle 3010 comprises elongated shaft 3012 extending along central longitudinal axis 3014 from proximal end 3016 to distal end 3018. Elongated shaft 3012 includes internal surface 3020, external surface 3022, and body 3024 extending between internal surface 3020 and external surface 3022 of elongated shaft 3012. Moreover, internal surface 3020 of elongated shaft 3012 defines bore 3026, such that elongated shaft 3012 is hollow to facilitate the collection of cellular material from within the biopsy area.

Specifically, upon insertion of biopsy needle 3010 within a patient, the biopsy needle is manipulated (e.g., rotated and/or translated about its central longitudinal axis 3014) to enable the collection of cellular material and fluid. Once the cellular material is dislodged via the manipulation of biopsy needle 3010, the cellular material flows within bore 3026 from distal end 3018 to proximal end 3016 of biopsy needle 3010 and is collected within a collection reservoir (e.g., syringe or other devices) in mechanical communication with proximal end 3016 of biopsy needle 3010. Furthermore, distal end 3018 of biopsy needle 3010 includes retrieval section 3028 configured to scrape, tear, bump, grind, cut, sheer, hammer, or slash portions of intact cellular material located within the biopsy area to facilitate their collection within the collection reservoir through bore 3026.

Figure 29A:
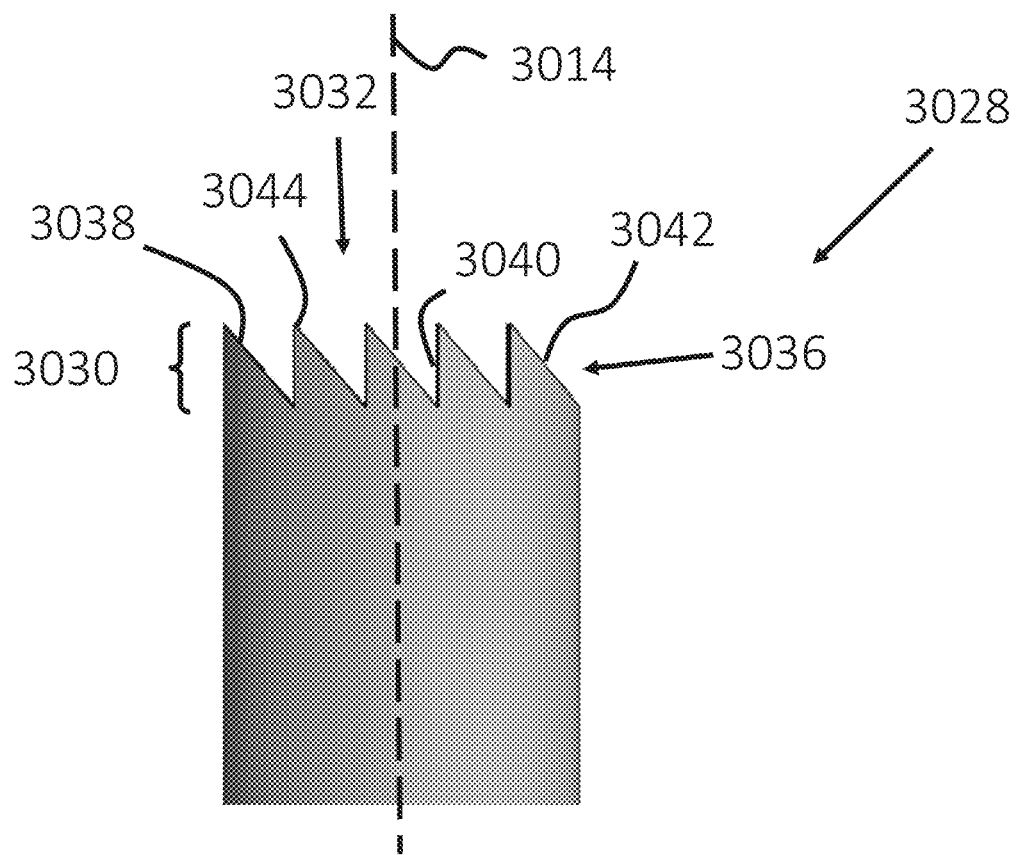
FIG. 29A is a side view of an embodiment of a retrieval section of a biopsy needle used to collect cellular materials with a first and second tooth design.
Figure 29B:
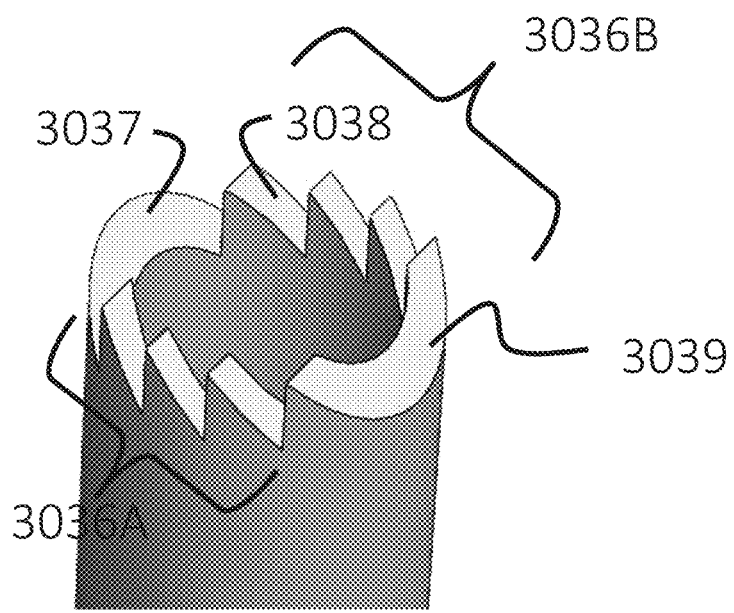
FIG. 29B is a perspective view of an embodiment of a retrieval section of a biopsy needle used to collect cellular materials with a first and second tooth design.

FIGS. 29A and 29B depict an embodiment of retrieval section 3028 disposed at distal end 3018 of biopsy needle 3010. As shown, retrieval section 3028 includes cutting edge 3030 disposed at leading-edge 3032 of retrieval section 3028. Cutting edge 3030 operably engages with the surrounding tissues to sheer off and dislodge cellular material from within the biopsy area during the biopsy procedure. In such embodiments, cutting edge 3030 includes alternating cutting designs disposed about a circumference of retrieval section 3028. In particular, a first cutting design and a second cutting design alternate to provide for the efficient capture of large portions of intact cellular material from within the biopsy area.

Cutting edge 3030 includes a first cutting design having a plurality of teeth 3036. Each tooth 3038 comprises face 3040, back 3042, and point 3044. A neutral rake angle of 0 degrees (i.e., rake angle being perpendicular to the direction of cut) is shown. The rake angle determines the angle of the cutting face 3040 of each tooth 3038. Moreover, having a rake angle of 0 degrees results in a vertical tooth 3038 that cuts faster and more aggressively. Furthermore, each tooth 3038 of cutting edge 3030 has a fleam angle (or bevel angle) of 0 degrees. In particular, the fleam is the angle across face 3040 of tooth 3038. The fleam permits each tooth 3038 to perform a tip-cut action—chiseling off cellular material as biopsy needle 3010 is manipulated and rotated about central longitudinal axis 3014.

In some embodiments, as depicted in FIG. 29B, cutting edge 3030 includes a single elongated tooth 3039, extending about leading-edge 3032 of retrieval section 3028 between groups of diametrically opposed teeth. Each tooth in groups 3036A and 3036B are longitudinally spaced in a distal direction moving from tooth 3039 to seat 3037, which is generally located in a diametrically opposed relation to tooth 3039. The rake and fleam angles of tooth 3039 and or the teeth in first plurality of teeth 3036A and second plurality of teeth 3036B may be the same or similar to those disclosed in relation to teeth depicted in FIG. 29A.

Figure 30A:
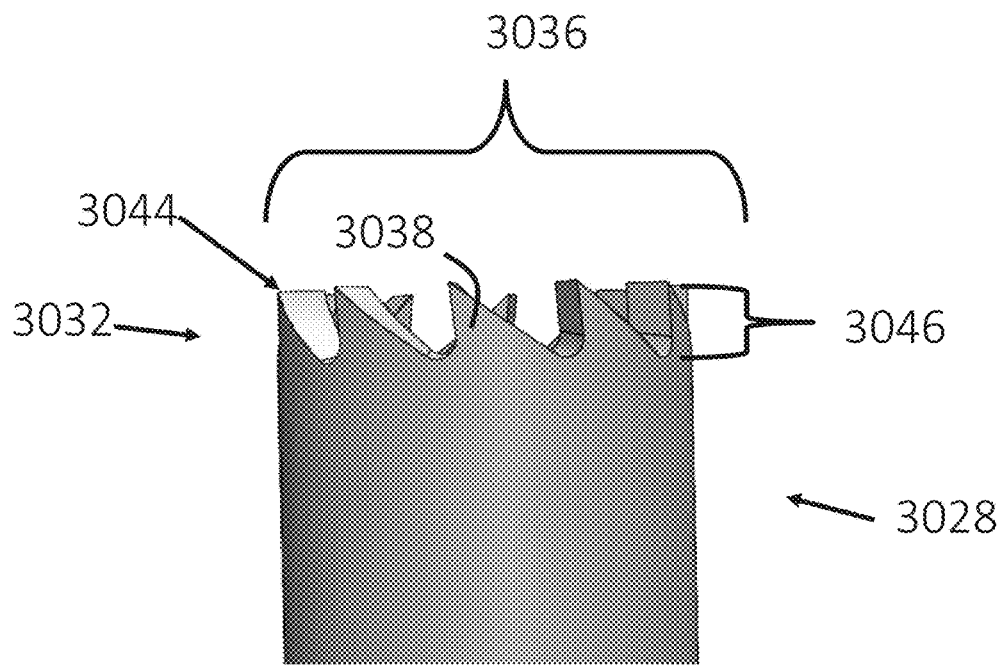
FIG. 30A is a side view of an embodiment of a retrieval section of a biopsy needle used to collect cellular material with a uniform tooth design.
Figure 30B:
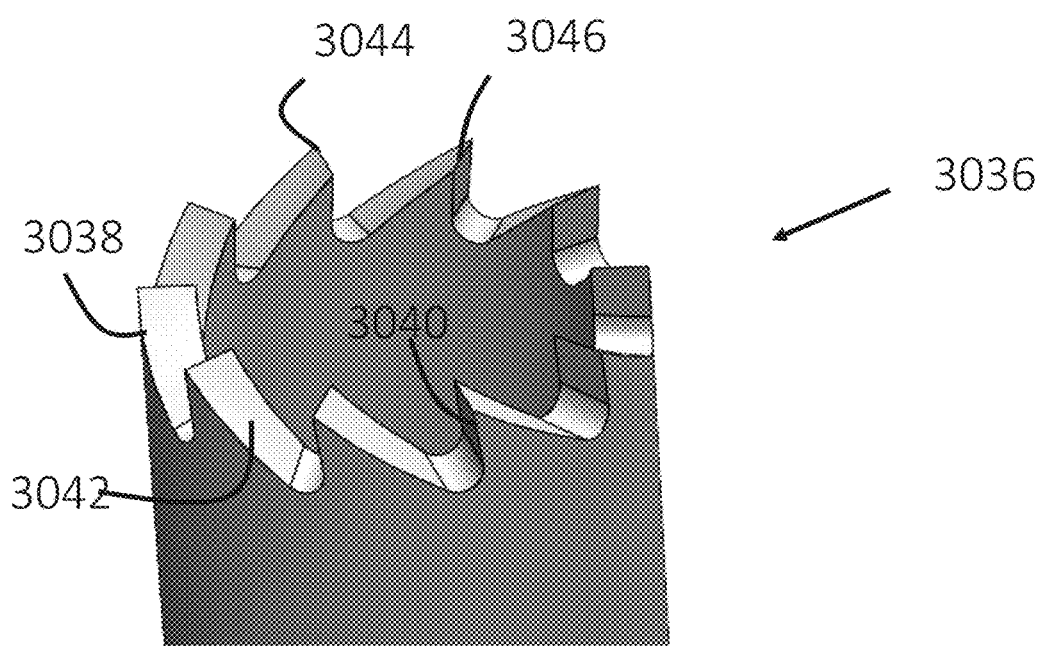
FIG. 30B is a perspective view of an embodiment of a retrieval section of a biopsy needle used to collect cellular material with a uniform tooth design.

FIGS. 30A and 30B depict an embodiment of retrieval section 3028 having a plurality of teeth 3036 circumferentially disposed about leading-edge 3032 of retrieval section 3028. Each tooth 3038 includes a distinct cutting design from the embodiments depicted in the previous figures. Each tooth 3038 includes face 3040, back 3042, and point 3044, each tooth 3038 of the third cutting design has an aggressive angle of attack due to the positive rake angle. Furthermore, the gullet depth 3046 (the space between point and the valley of each tooth) and gullet area is increased by the positive angle of attach thereby increasing the amount of cellular material that can be retrieved while cutting.

Figure 31A:
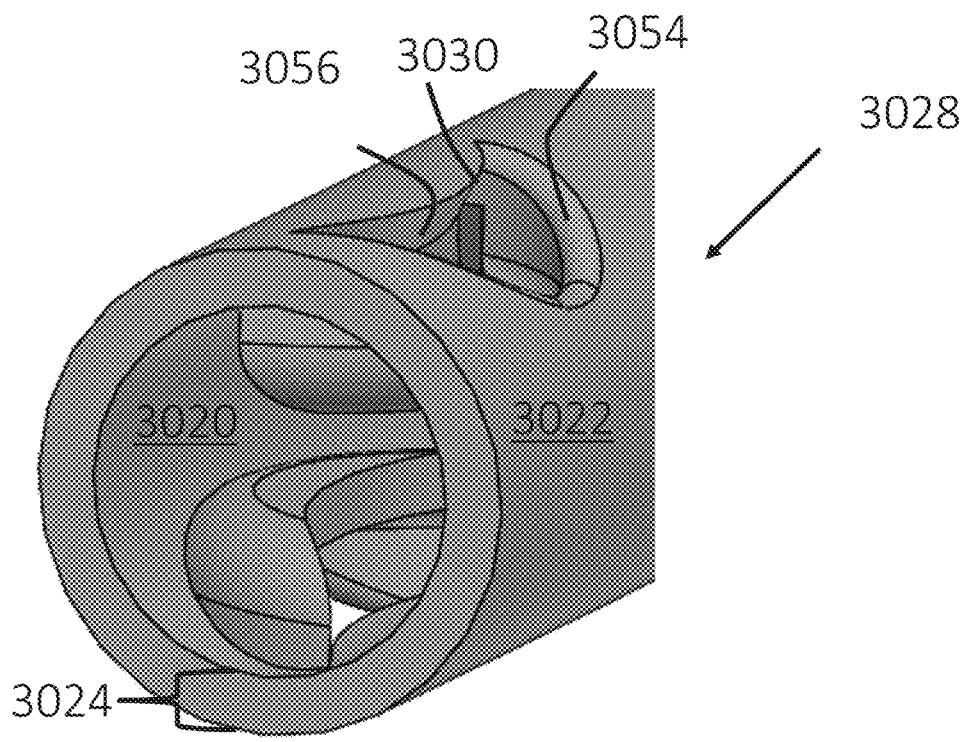
FIG. 31A is a cross-sectional view of an embodiment of a retrieval section of a biopsy needle used to collect cellular material having a plurality of cutting apertures disposed within the body of the elongated shaft.
Figure 31B:
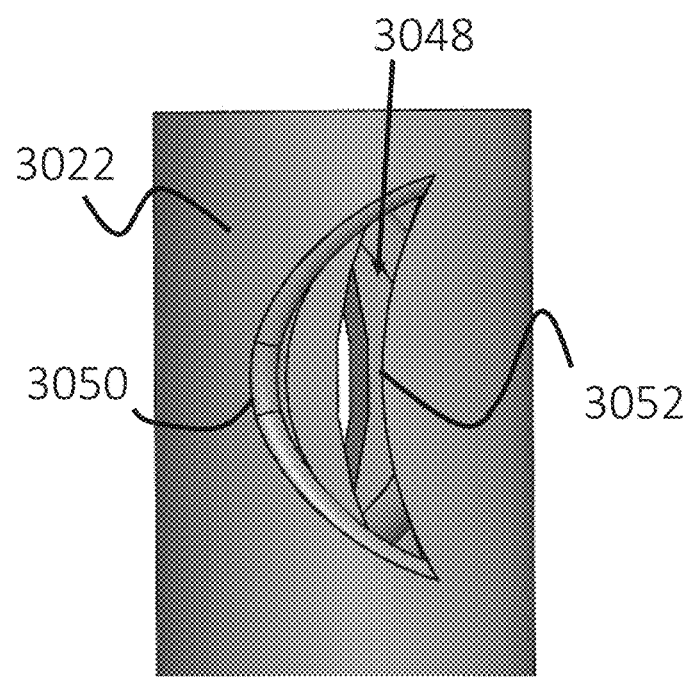
FIG. 31B is a close-up view of an embodiment of a cutting aperture disposed within the body of the elongated shaft.

FIGS. 31A and 31B depict another embodiment of retrieval section 3028. It should be noted that FIG. 31 do not depict the terminal end of biopsy needle 3010, which may have an angled or beveled shape to aid in the insertion of the needle and the cutting of tissue.

The embodiment of retrieval section 3028 as provided in FIG. 31 includes a plurality of crescent-shaped cutting apertures 3048 disposed through lateral wall/body 3024. Each cutting aperture 3048 includes major aperture edge 3050 (the edge with the longer length) and minor aperture edge 3052 (the edge with the shorter length). In particular, major aperture edge 3050 comprises aperture wall 3054 extending between internal surface 3020 and exterior surface 3022 of elongated shaft 3012. Specifically, major aperture edge 3050 has a semi-circular shaped edge; however, alternative embodiments are contemplated having various geometrically shaped edges, such as square, linear, and triangular. Similarly, minor aperture edge 3052 includes beveled wall 3056 extending between internal surface 3020 and external surface 3022. However, alternative embodiments are contemplated having various geometrically shaped edges, such as square, linear, and triangular.

Cutting edge 3030 of beveled wall 3056 is formed at the intersection of external surface 3022 and wall 3056. In some embodiments, a line intersecting the midpoints of both major aperture edge 3050 and minor aperture edge 3052 is aligned perpendicular to central longitudinal axis 3014 of needle 3010. In some embodiments, the line intersecting the midpoints of both major aperture edge 3050 and minor aperture edge 3052 is non-parallel to central longitudinal axis 3014 of needle 3010. There orientations ensure that the rotation of needle 3010 about central longitudinal axis 3014 cut the adjacent tissue.

As retrieval section 3028 of biopsy needle 3010 is rotated about central longitudinal axis 3014, cutting edge 3030 engages with cellular material located within the biopsy area. Once the cellular material is dislodged from within biopsy area by cutting edge 3030, the cellular material is directed within bore 3026 via the beveled orientation of wall 3056 and preferably also a vacuum force created by the collection reservoir coupled with the proximal end 3016 of biopsy needle 3010. Additionally, multiple crescent cutting apertures 3048 can be disposed in distinct orientations or arrangements. Thus, regardless of how biopsy needle 3010 is manipulated, at least one cutting edge 3030 will engage the tissue of the biopsy area for collection.

Figures 32A, 32C:
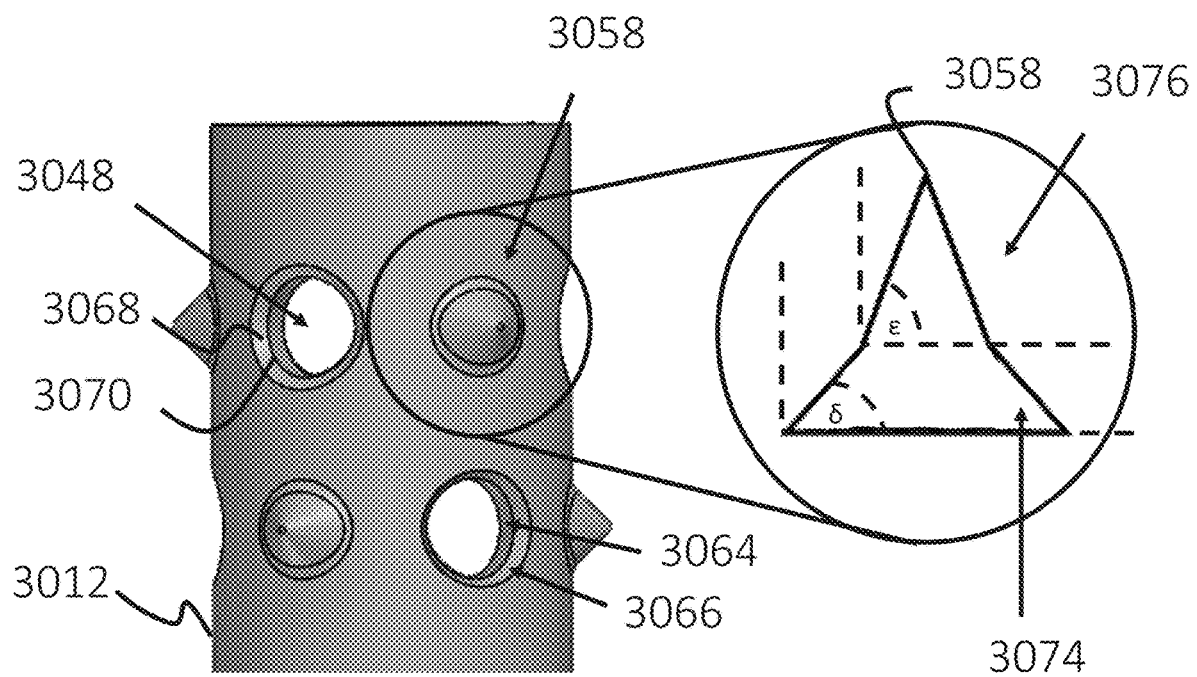
FIG. 32A is a side view of an embodiment of a retrieval section of a biopsy needle used to collect cellular material having a series of alternating conical protrusions and cutting apertures.
FIG. 32C is an elevation diagram of an embodiment of a conical protrusion in FIG. 32A.
Figure 32B:
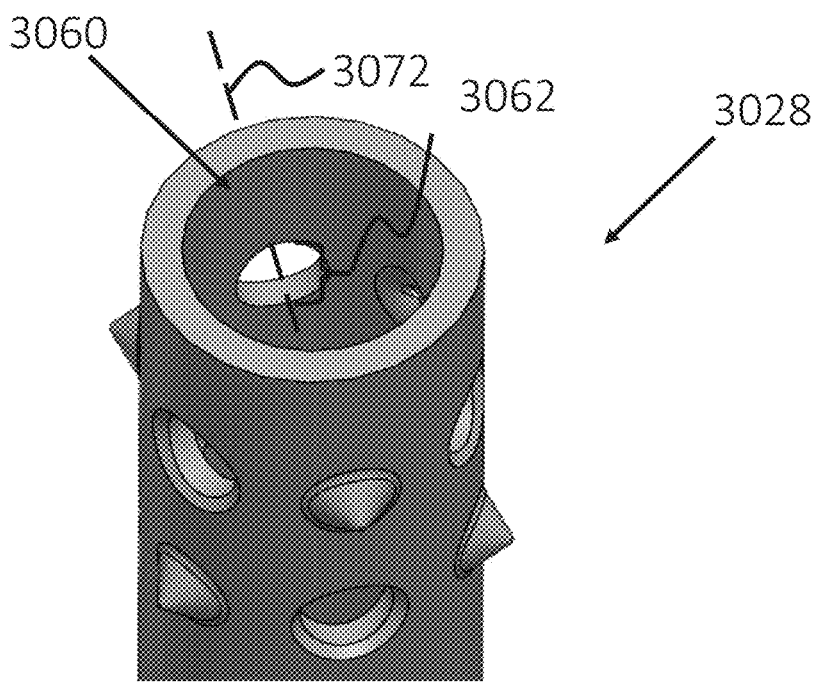
FIG. 32B is a perspective view of an embodiment of a retrieval section of a biopsy needle used to collect cellular material having a series of alternating conical protrusions and cutting apertures.

An embodiment of retrieval section 3028 of biopsy needle 3010 as shown in FIG. 32 includes a plurality of circular cutting apertures 3048 and conical protrusions 3058 configured to cut and tear large portions of cellular material free during manipulation of biopsy needle 3010 within the biopsy area. Cutting apertures 3048 and protrusions 3058 may be randomly disposed of elongated shaft 3012 of biopsy needle 3010 or arranged in a pattern. As depicted in FIG. 32, a patterned embodiment includes alternating cutting apertures 3048 and protrusions 3058 in both a horizontal and vertical direction about elongated shaft 3012. During manipulation of biopsy needle 3010, dislodged cellular material may be collected within bore 3026 via cutting apertures 3048 and bore opening 3060.

Each cutting aperture 3048 is disposed through body 3024 of elongated shaft 3012 from internal surface 3020 to external surface 3022. More particularly, channel 3062 includes first portion 3064 and second portion 3066. First portion 3064 of channel 3062 includes a beveled edge and shares common boundary 3070 with second portion 3066. Channel 3062 includes channel axis 3072 disposed in an orthogonal relationship with central longitudinal axis 3014 of elongated shaft 3012.

Moreover, embodiments of cutting apertures 3048 disposed through body 3024 of retrieval section 3028 may include any other shape, size, or design of cutting apertures 3048 that is in line with any other embodiment of retrieval section 3028 disclosed herein.

Conical protrusions 3058 extend from external surface 3022 of elongated shaft 3012 from first protrusion end 3074 to second protrusion end 3076. First protrusion end 3074 of conical protrusion 3058 has a protrusion angle δ and second protrusion end 3076 has protrusion angle E. Protrusion angle δ is a smaller angle than protrusion angle E. Moreover, conical protrusion 3058 is configured to be in mechanical communication with the biopsy area and tears cellular material free, which is then collected through cutting aperture 3048 and/or bore opening 3060.

FIGS. 33A-33D depict an embodiment of retrieval section 3028 of the biopsy needle having a first pair of diametrically opposed cutting apertures 3048A and a second pair of diametrically opposed cutting apertures 3048B. Each cutting aperture 3048 is identical and similarly disposed within body 3024 of elongated shaft 3012 from external surface 3022 to internal surface 3020. In some embodiments, cutting apertures 3048 are not in pairs, but are equidistantly spaced about the circumference of the biopsy needle.

Figure 33A:
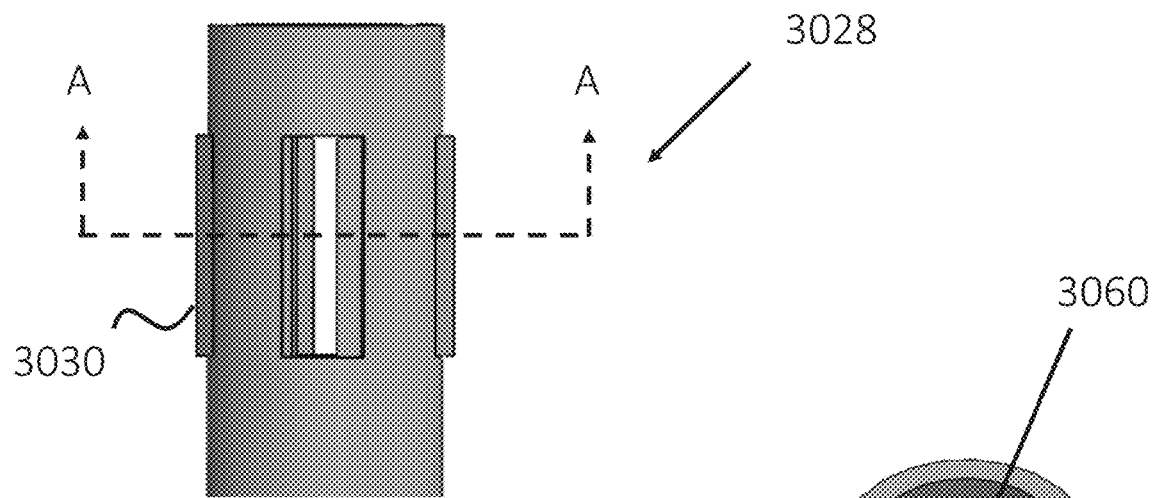
FIG. 33A is a side view of an embodiment of a retrieval section of a biopsy needle having a series of diametrically opposed cutting apertures.
Figure 33B:
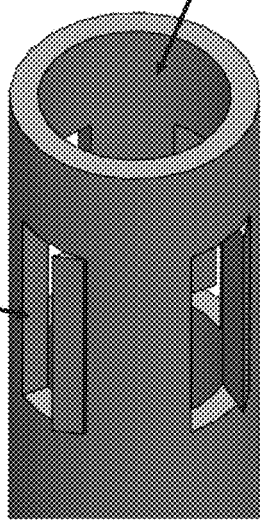
FIG. 33B is a perspective view of an embodiment of a retrieval section of a biopsy needle having a series of diametrically opposed cutting apertures of FIG. 33A.
Figure 33C:
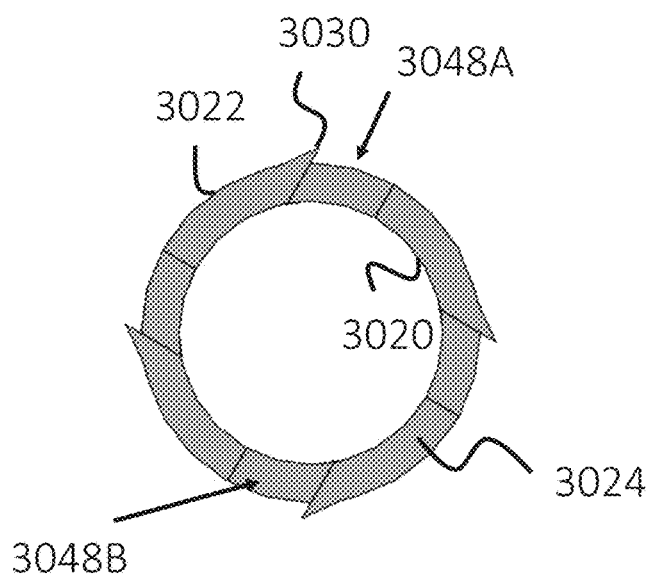
FIG. 33C is a top view of an embodiment of a retrieval section of a biopsy needle having a series of diametrically opposed cutting apertures taken along line A-A in FIG. 33A.
Figure 33D:
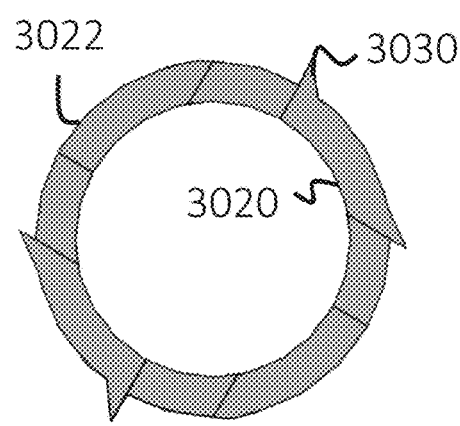
FIG. 33D is a top view of an embodiment of a retrieval section of a biopsy needle having a series of cutting edges extending from the exterior surface of the retrieval section.

Each cutting aperture 3048 includes cutting edge 3030 extending outwardly away from external surface 3022. Each cutting edge 3030 is configured to engage with the tissue within the biopsy area, thereby dislodging the cellular material. Once dislodged, the cellular material is collected within bore 3026 via cutting aperture 3048 and/or bore opening 3060 disposed at distal end 3018 of biopsy needle 3010. Moreover, as depicted in FIG. 33D, a series of cutting edges 3030 extend outwardly from external surface 3022 and are configured to allow the retrieval section 3028 to cut the tissue within the biopsy area when retrieval section 3028 is rotated in both a clockwise and counterclockwise direction.

Figures 34A, 34B:
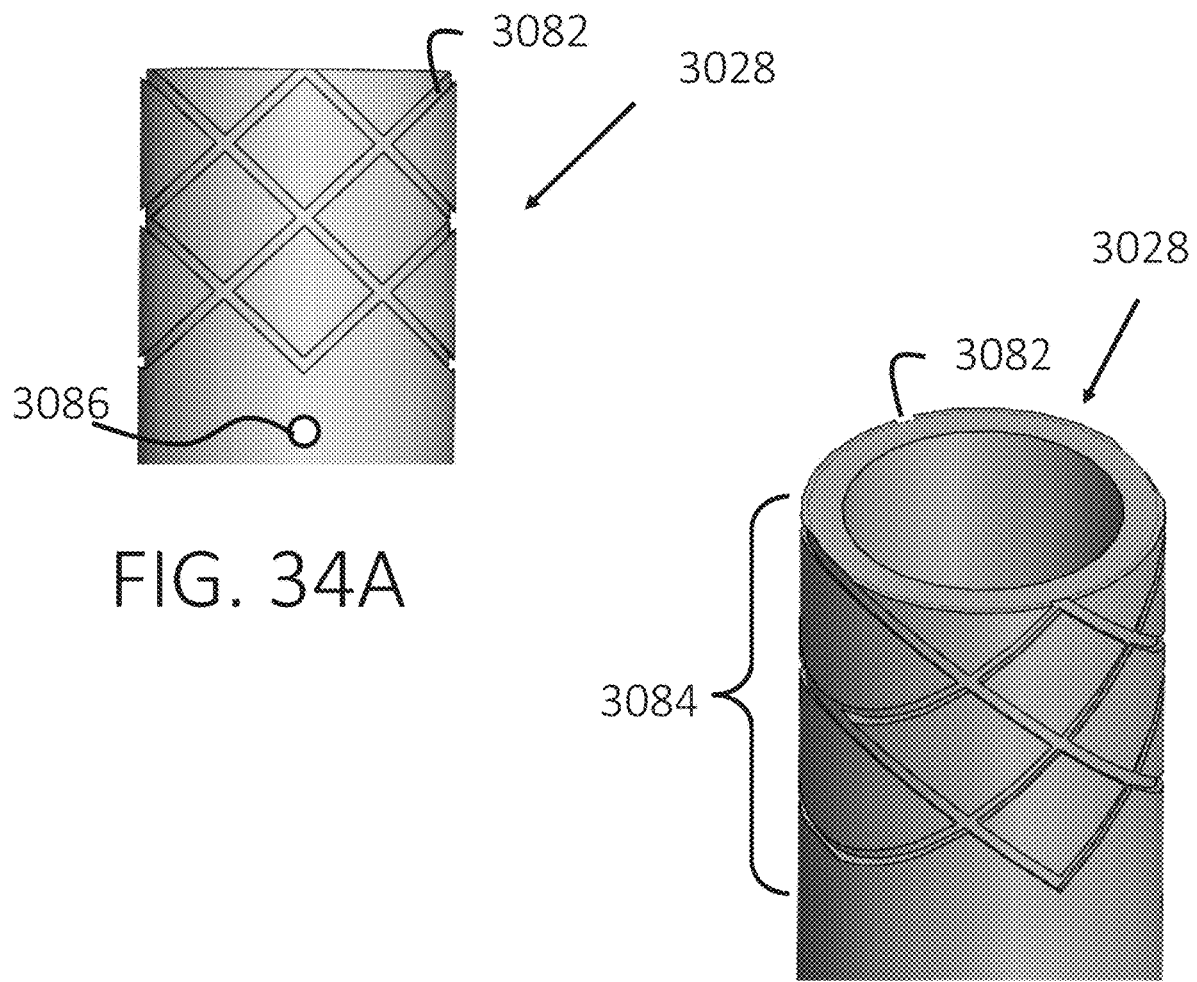
FIG. 34A is a side view of an embodiment of a retrieval section of a biopsy needle having a series of grooves disposed within the body of the elongated shaft.
FIG. 34B is a perspective view of an embodiment of a retrieval section of a biopsy needle having a series of grooves disposed within the body of the elongated shaft.

An embodiment shown in FIGS. 34A-34B includes retrieval section 3028 having chemically etched, or laser cut grooves 3082 disposed on elongated shaft 3012 of biopsy needle 3010. Grooves 3082 are configured to break cellular material free from within the biopsy area during manipulation of biopsy needle 3010. In particular, grooves 3082 may be straight, angled, crossed (as shown), or any other pattern that facilitates the collection of cellular materials. In an embodiment, retrieval section 3028 may include one or more cutting apertures disposed within the body of retrieval section 3028. In such embodiments, the cutting apertures may be in line with any other embodiment of retrieval section 3028 disclosed herein.

The material dislodged during manipulation of retrieval section 3028 is captured through bore opening 3060 and/or collection apertures 3086. Collection apertures 3086 may be disposed above, below, and or within knurling portion 3084 to facilitate the capture of dislodged cellular materials.

Figure 35A:
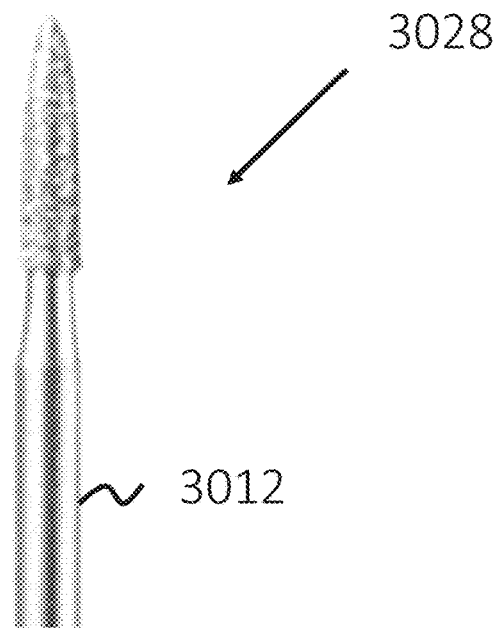
FIG. 35A is a side view of an embodiment of a retrieval section of a biopsy needle having foreign objects disposed on an outer surface of the biopsy needle.
Figure 35B:
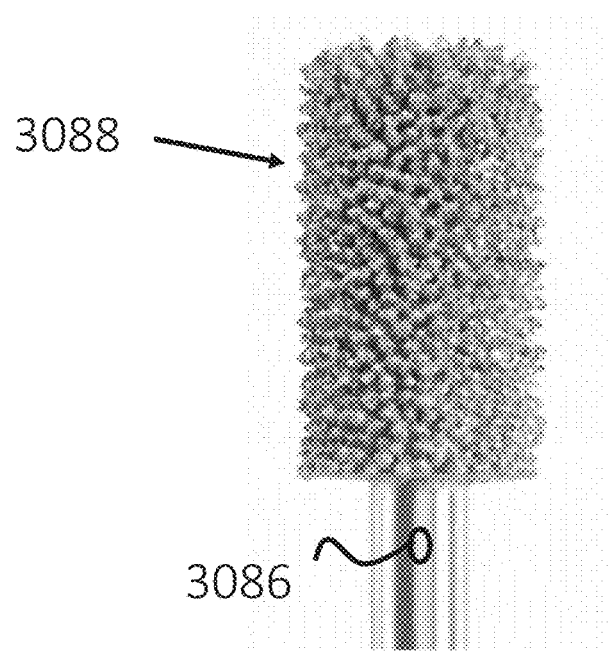
FIG. 35B is a side view of an embodiment of a retrieval section of a biopsy needle having foreign objects disposed on an outer surface of the biopsy needle.

In some embodiments FIGS. 35A and 35B, retrieval section 3028 includes rough grinding surface 3088 disposed on external surface 3022 of retrieval section 3028. In some embodiments, rough grinding surface 3088 can be created by disposing foreign materials on the outer surface 3022 of elongated shaft 3012. Rough grinding surface 3088 is adapted to dislodge cellular material within the biopsy area by grinding cells away from the tissue of the biopsy area. Once cellular material is dislodged by grinding surface 3088, bore 3060 and/or collection apertures 3086 disposed throughout elongated shaft 3012 can be used to facilitate the collection of dislodged cellular materials.

In an embodiment, retrieval section 3028 may include one or more cutting apertures disposed within the body of retrieval section 3028. In such embodiments, the cutting apertures may be in line with any other embodiment of retrieval section 3028 disclosed herein.

Figure 36A:
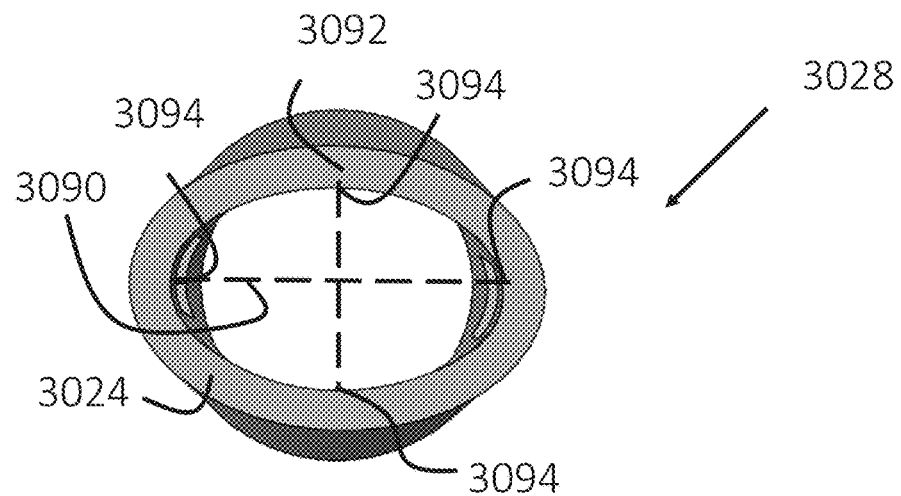
FIG. 36A is a top view of an embodiment of a retrieval section of a biopsy needle having an elliptically shaped bore opening and a cutting aperture disposed within the body of the elongated shaft.
Figure 36B:
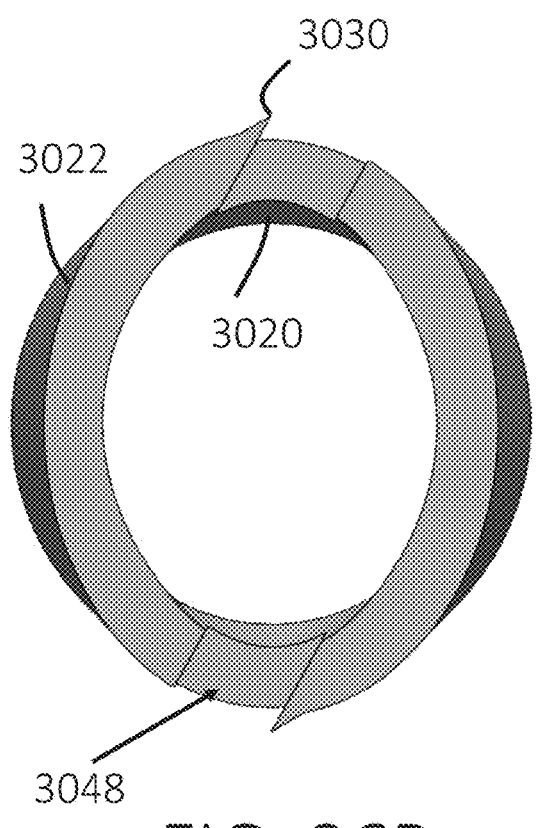
FIG. 36B is a cross-sectional view of an embodiment of a retrieval section of a biopsy needle having an elliptically shaped bore opening and a cutting aperture disposed within the body of the elongated shaft taken along line B-B of FIG. 36C.
Figure 36C:
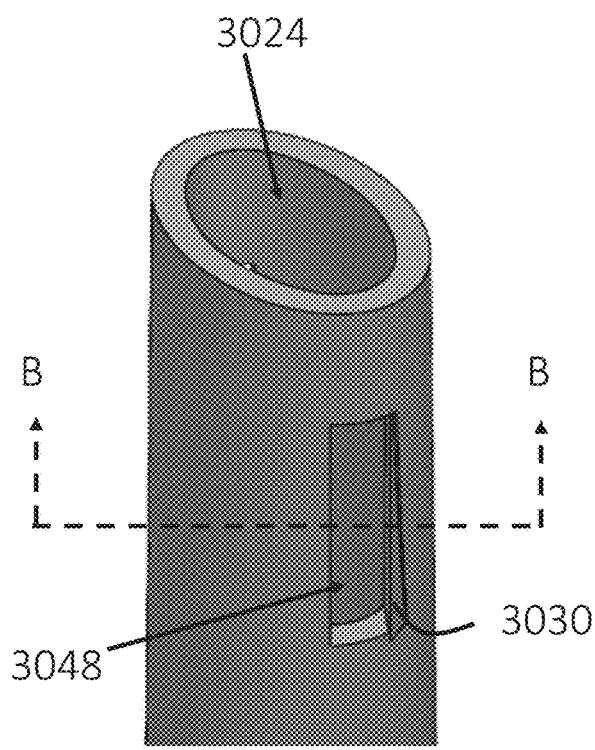
FIG. 36C is a perspective view of an embodiment of a retrieval section of a biopsy needle having an elliptically shaped bore opening and a cutting aperture disposed within the body of the elongated shaft.

In an embodiment shown in FIGS. 36A-36C, retrieval section 3028 of biopsy needle 3010 has an angled tip, for example a 12-degree angle from the central longitudinal axis of the biopsy needle. In some embodiments, retrieval section 3028 has a cross-sectional geometry of an ellipse. The ellipse includes major axis 3090 and minor axis 3092 in an orthogonal relationship with major axis 3090.

Furthermore, retrieval section 3028 of includes a pair of diametrically opposed cutting apertures 3048 disposed at vertices 3094 of major axis 3090 of body 3024 of elongated shaft 3012 from internal surface 3020 to exterior surface 3022. Each cutting aperture includes cutting edge 3030 extending outwardly from external surface 3022 of body 3024. Cutting edge 3030 is configured to engage with the tissue within the biopsy area. Thus, when the biopsy needle is manipulated, cutting edge 3030 dislodges cellular material, which is collected within bore 3026 via cutting apertures 3048 and/or bore opening 3060.

Moreover, embodiments of cutting apertures 3048 disposed through body 3024 of retrieval section 3028 may include any other shape, size, or design of cutting apertures 3048 in line with any other embodiment of retrieval section 3028 disclosed herein.

Figure 37A:
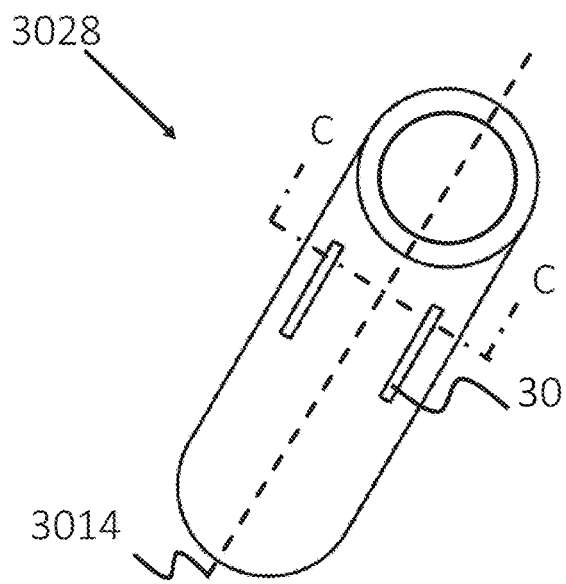
FIG. 37A is a perspective view of an embodiment of a retrieval section of a biopsy needle having cutting apertures disposed within the body of the biopsy needle at the same distance from the terminal end of the retrieval section.
Figure 37B:
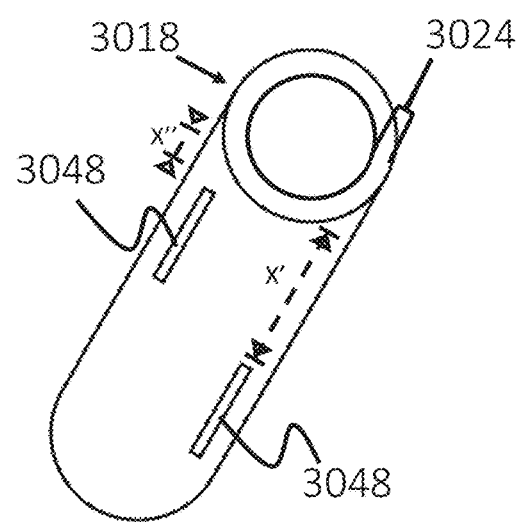
FIG. 37B is a perspective view of an embodiment of a retrieval section of a biopsy needle having cutting apertures disposed within the body of the biopsy needle at a different distance from the terminal end of the retrieval section.
Figure 37C:
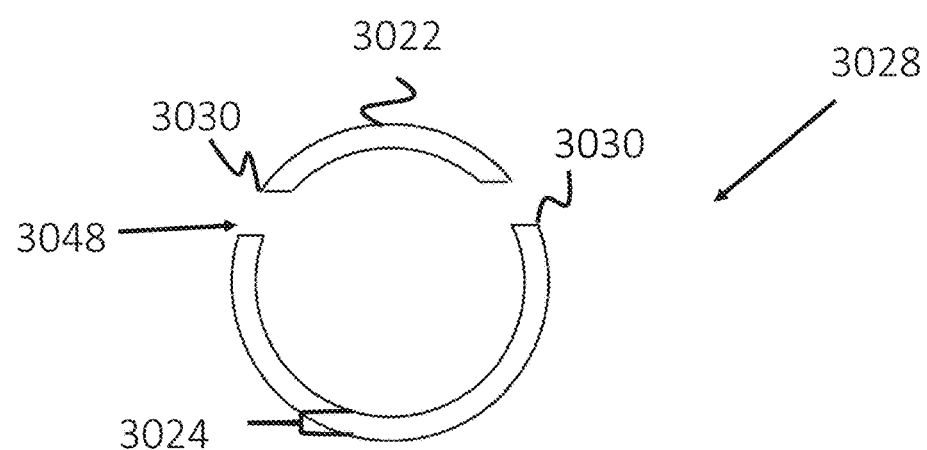
FIG. 37C is a cross-sectional view of an embodiment of a retrieval section of a biopsy needle taken along line C-C of FIG. 37A having cutting apertures disposed within the body of the biopsy needle.

In some embodiments, as shown in FIGS. 37A-37C, retrieval section 3028 has a cross-sectional geometry of a circle; however, it is appreciated that various cross-sectional geometries may be provided depending on the specific needs of the biopsy needle during the procedure. Furthermore, cutting apertures 3048 are disposed within body 3024. Specifically, cutting apertures 3048 may be disposed from one another at the same distance from terminal end 29 (see FIG. 37A) or disposed at different distances (x', x") from terminal end 29 of retrieval section 3028 (see FIG. 37B).

Additionally, cutting edges 3030 are flush with and follow the curvature (i.e., circumference) of external surface 3022 of retrieval section 3028. In such embodiments, the manipulation of retrieval section 3028 laterally in an orthogonal relationship with axis 3014 forces tissues within the biopsy area in cutting apertures 3048. Thus, upon rotation of retrieval section 3028 about axis 3014 in either a clockwise or counterclockwise rotation, at least one of the cutting edges 3030 sheers off the tissue disposed within cutting aperture 3048 for sample collection.

Moreover, embodiments of cutting apertures 3048 disposed within body 3024 of retrieval section 3028 may include any other shape, size, or design of cutting apertures 3048 that are in line with any other embodiment of retrieval section 3028 disclosed herein.

Figure 38A:
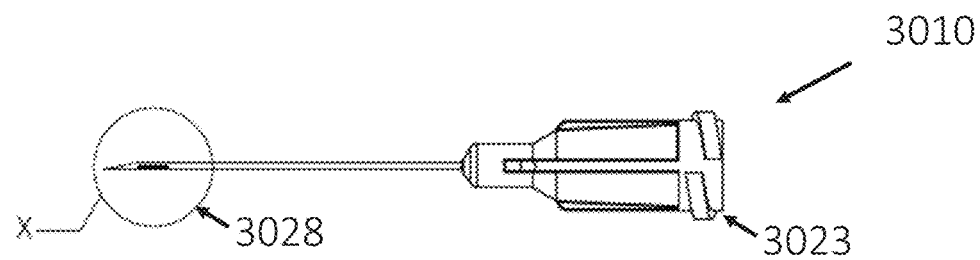
FIG. 38A is a side view of an embodiment of a biopsy needle.
Figure 38B:
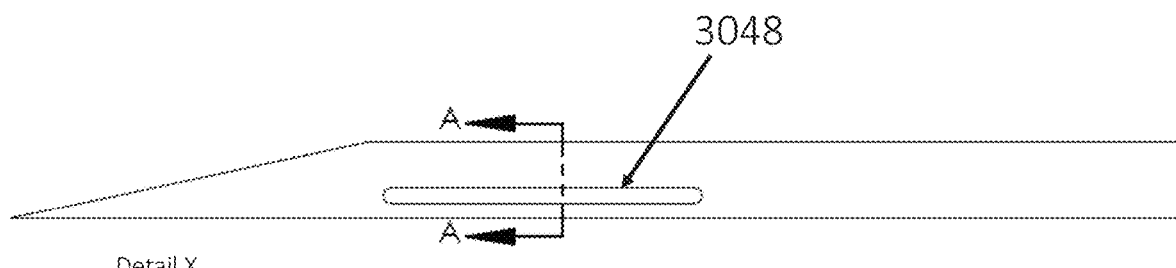
FIG. 38B is a side view of Detail X in FIG. 38A.
Figure 38C:
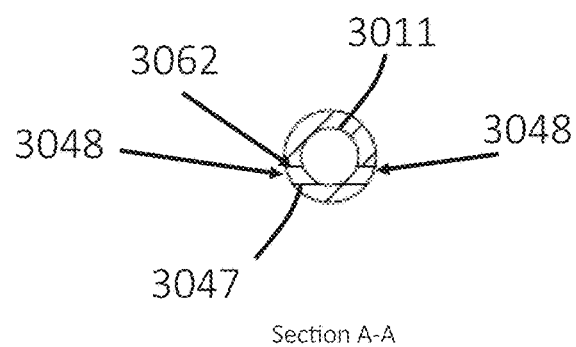
FIG. 38C is a cross-sectional view of an embodiment of a retrieval section of a biopsy needle taken along line A-A of FIG. 38A.

Some embodiments, a depicted in FIG. 38 include multiple cutting apertures 3048 with each disposed on opposite sides of biopsy needle 3010. In some embodiments, outer lateral edge 3027 of channel 3062 is tangentially aligned with the interior surface 3011 of biopsy needle 3010.

Figure 39A:
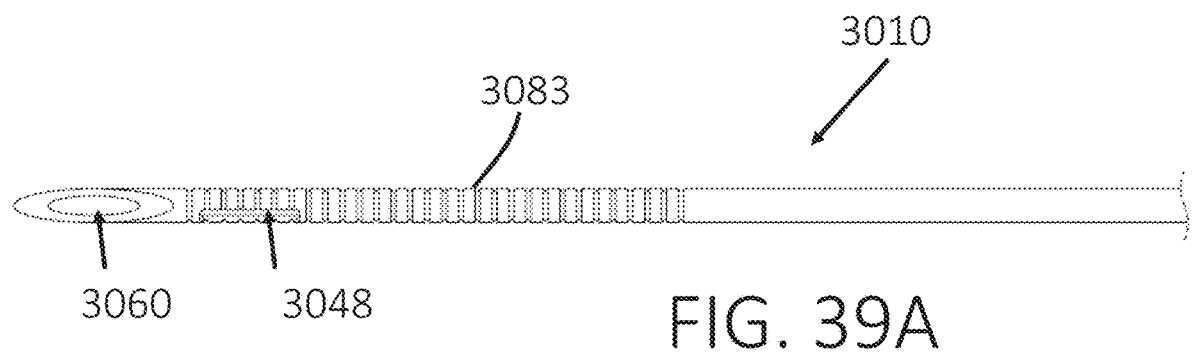
FIG. 39A is a side view of an embodiment of a biopsy needle.
Figure 39B:
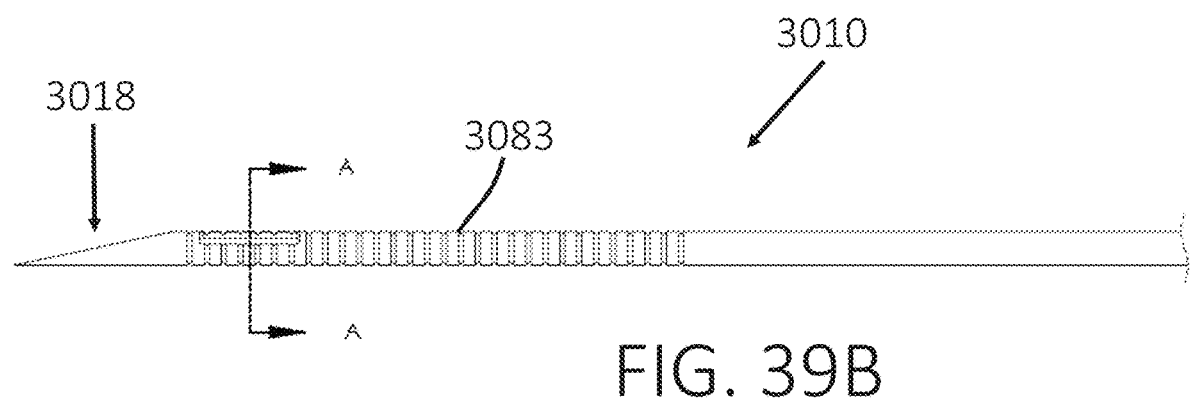
FIG. 39B is a side view of an embodiment of a biopsy needle.
Figure 39C:
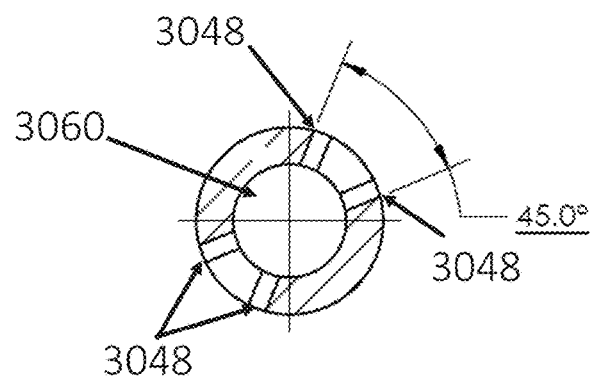
FIG. 39C is a cross-sectional view of an embodiment of a retrieval section of a biopsy needle taken along line A-A of FIG. 39A.

As illustrated in FIG. 39, some embodiments further include a plurality of annular grooves 3083. Grooves 3083 are configured to break cellular material free from within the biopsy area during manipulation of biopsy needle 3010. Similar to grooves 3082 in FIG. 34, grooves 3083 may be straight and perpendicular to the central longitudinal axis of needle 3010 as shown in FIG. 39 or they may be angled, crossed, or have any other pattern that facilitates the collection of cellular materials. In some embodiments, retrieval section grooves are located in the same general area as cutting apertures 3048, however, some embodiments may have grooves 3083 longitudinally offset from cutting apertures 3048.

Figure 40A:
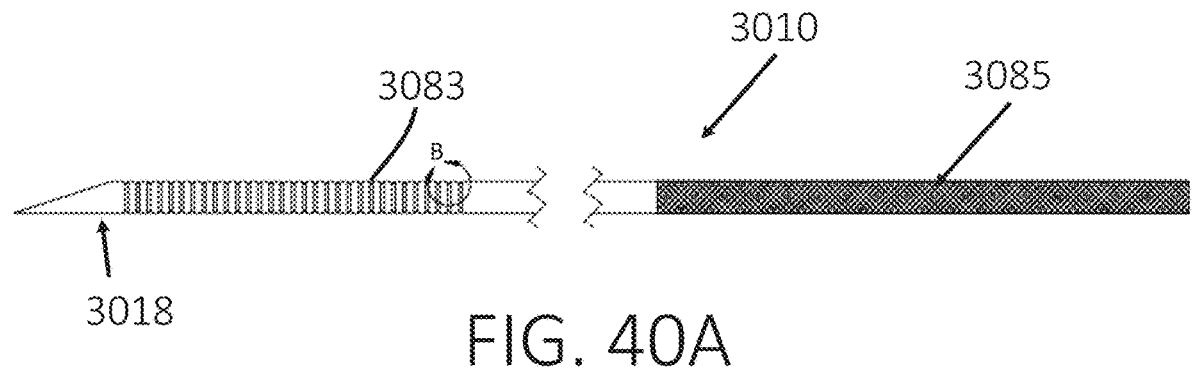
FIG. 40A is a side view of an embodiment of a biopsy needle.
Figure 40B:
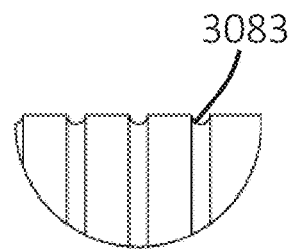
FIG. 40B is a side view of Detail B in FIG. 40A.

Moreover, some embodiments may include grooves 3083 without include cutting apertures 3048 as depicted in FIG. 40. In such embodiments, tissue enters bore channel 3060 in biopsy needle 3010 through distal end 3018.

Some embodiments include biopsy needle 3010 having a proximal section with knurling 3085 or other friction increasing features. The friction increasing features on the proximal portion aid in retaining a secure connection with needle 3010.

Referring back to FIG. 39C, the depicted embodiment illustrates the circumferential spacing of cutting apertures 3048 about needle 3010. The depicted embodiment includes two pairs of diametrically opposed cutting apertures 3048 with the closest cutting apertures 3048 circumferentially offset roughly 45 degrees. As depicted, the angular offset is from the furthest edges of the two adjacent cutting apertures 3048, however, alternative points on the two adjacent cutting apertures 3048 may establish the 45-degree separation.

In some embodiments, the circumferential spacing between two adjacent cutting apertures is between 5 and 90 degrees. In some embodiments, the circumferential spacing between two adjacent cutting apertures is between 5 and 180 degrees. It should also be understood that the circumferential spacing of cutting apertures may apply to the other embodiments disclosed herein.

Method of Manufacturing Needle

Figure 41:
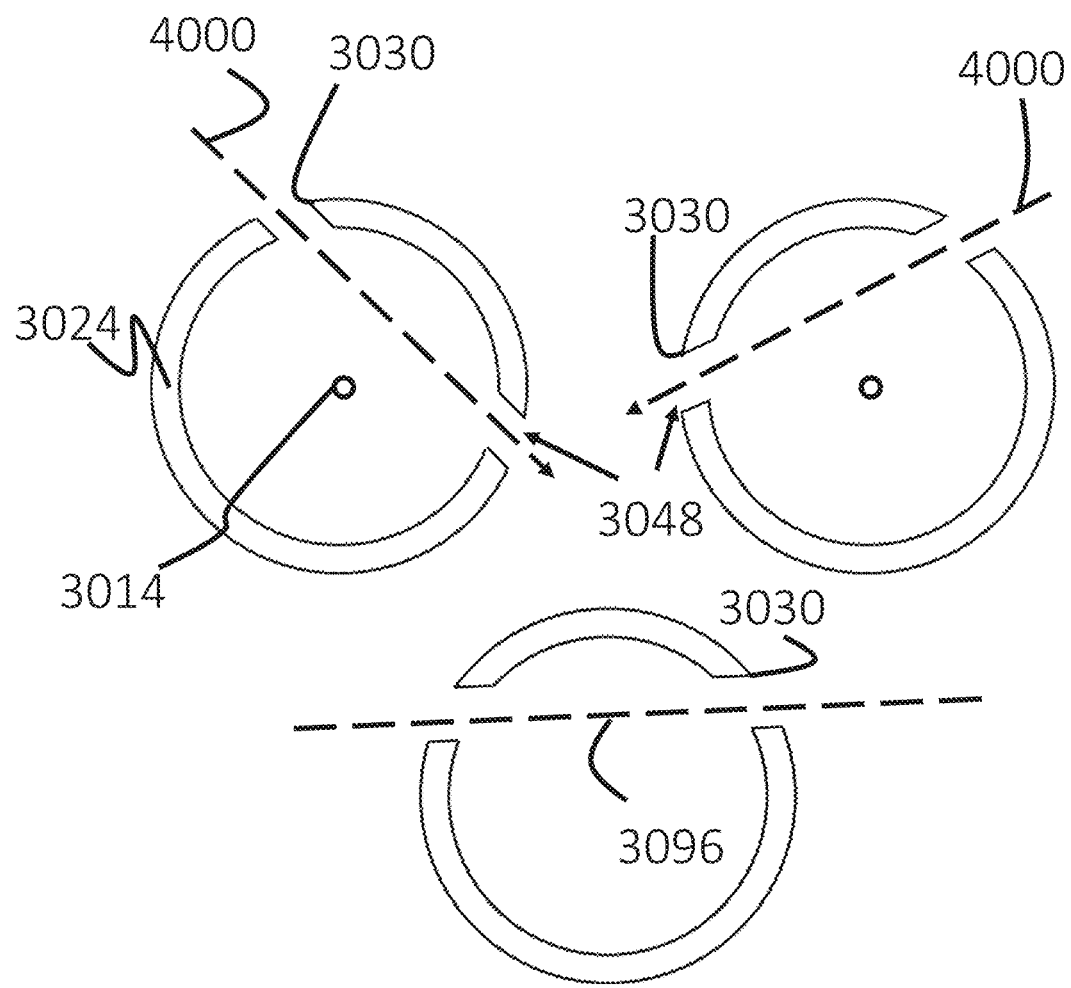
FIG. 41 is a cross-sectional view of the elongated shaft of the biopsy needle depicting a laser cutting a pair of cutting apertures within the body of the elongated shaft.

FIG. 41 depicts a method of manufacturing an embodiment of biopsy needle 3010 utilizing a novel methodology that results in biopsy needle 3010 having multiple cutting edges 3030 (or cutting apertures 3048). Each cutting edge 3030 is manufactured in pairs, such that no matter which direction biopsy needle 3010 is rotated about its central longitudinal axis 3014, cutting edge 3030 engages tissue within the biopsy area. In an embodiment, cutting edges 3030 are manufactured using a high-powered laser. In particular, the laser is directed toward body 3024 of elongated shaft 3012 at an angle along secant line 3096. In an embodiment, one or more laser cuts 4000 made be made along one or more secant lines 3096 to manufacture multiple cutting apertures 3048 within body 3024 of elongated shaft 3012, such as above or below previous laser cut(s).

Figure 42A:
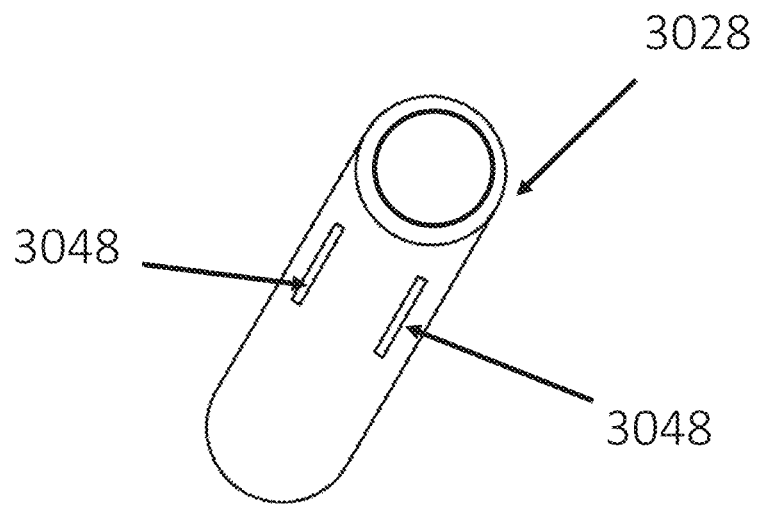
FIG. 42A is a perspective view of an embodiment of a biopsy needle in which the cutting apertures are each disposed the same distance from the retrieval section.
Figure 42B:
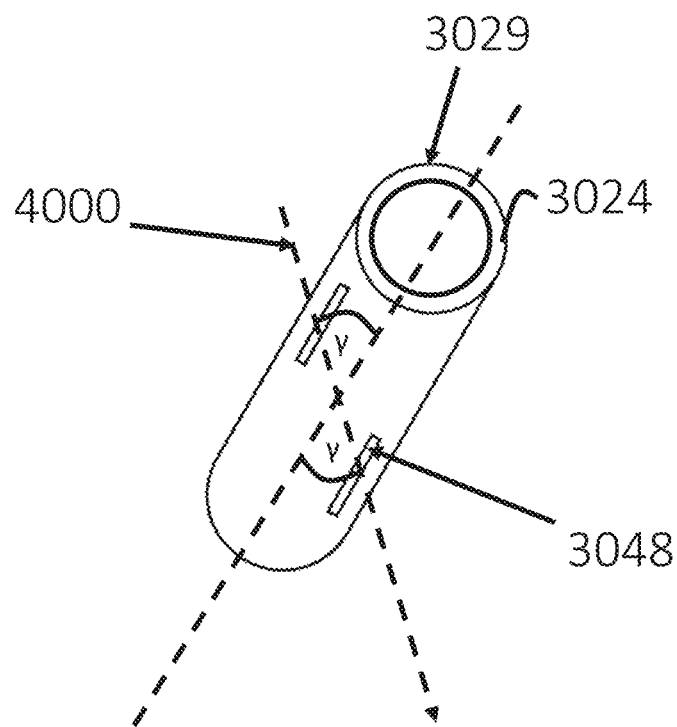
FIG. 42B is a perspective view of an embodiment of a biopsy needle in which the cutting apertures are disposed at different distances from the retrieval section.
Figure 42C:
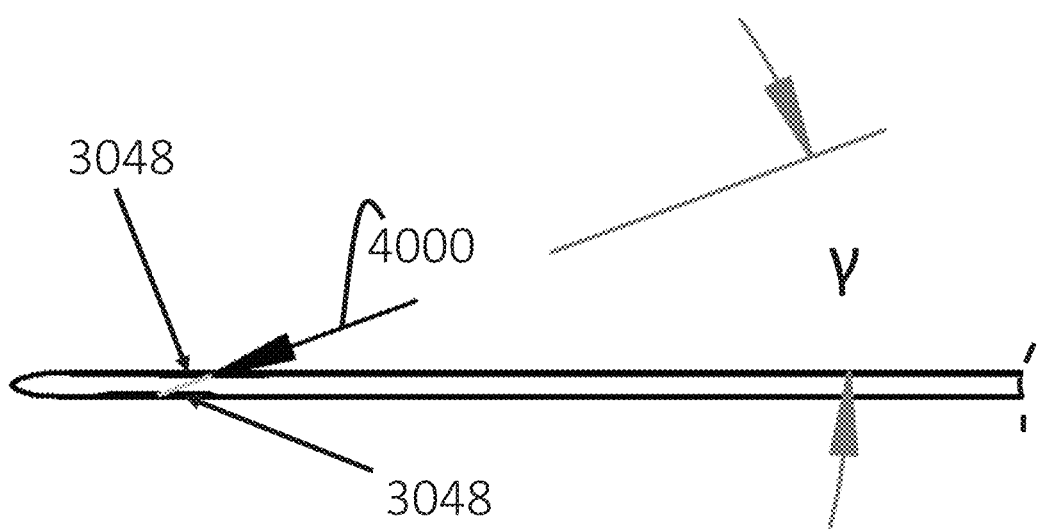
FIG. 42C is a side view of an embodiment of a biopsy needle in which the cutting apertures are disposed at different distances from the retrieval section.

FIG. 42A depicts an embodiment of the novel method of manufacturing in which laser cuts 4000 are formed within body 3024 at the same distance from distal end 3018 of biopsy needle 3010. Alternatively, FIGS. 42B and 42C depict an embodiment of the novel method of manufacturing in which laser cuts 4000 are formed within body 3024 of elongated shaft 3012 at angle γ, such that cutting apertures 3048 are formed within body 3024 at different distances from distal end 29 of biopsy needle 3010. By manufacturing multiple cutting apertures 3048 of biopsy needle 3010 with a single pass of the laser, the overall manufacturing time of biopsy needle 3010 is significantly reduced.

While the particular device is herein shown and described in detail, it is to be understood that the subject matter which is encompassed by the present invention is limited only by the claims.

Components included in one embodiment can be used in other embodiments in any appropriate combination. For example, any of the various components described herein and/or depicted in the FIGS. may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

What is claimed is:

1. A tissue extraction device, comprising:
    a syringe coupled to an elongated needle, wherein the needle is configured to rotate relative to the syringe;
    an evacuatable tissue chamber being established at least in part by a hollow interior of the needle and configured to be subject to a vacuum;
    a motor operably coupled to the needle to oscillate the needle back and forth in a longitudinal direction;
    the needle further including:
        a proximal end and a distal end with a main body extending therebetween;
        a cutting tip located at the distal end;
        a central longitudinal axis extending between the proximal end and the distal end;
        the hollow interior of the needle in fluidic communication with the syringe;
        a first cutting aperture disposed through the main body, wherein the first cutting aperture has a rectangular shape with a long end of the rectangular shape extending parallel to the central longitudinal axis of the needle;
        a second cutting aperture disposed through the main body, wherein the second cutting aperture has a rectangular shape with a long end of the rectangular shape extending parallel to the central longitudinal axis of the needle;
        each of the first cutting aperture and the second cutting apertures creating a channel with a central axis extending from an exterior surface to an interior surface of the main body, wherein the central axes are axially aligned with each other; and
        the first cutting aperture and the second cutting apertures longitudinally spaced in a proximal direction from the distal end of the main body, such that there is a continuous portion of the main body between the first cutting aperture and the second cutting aperture and the distal end of the main body.

2. The device of claim 1, wherein the syringe comprises a barrel and a plunger slidably disposed in the barrel and movable to evacuate the tissue chamber, and the device further comprises:
    a plunger activation assembly comprising a receptacle configured for closely receiving a proximal flange of the plunger, and opposed arms extending distally away from the receptacle, at least one of the arms comprising an inclined ramp that abuts a motor activation switch in a first plunger position to activate the motor and that does not abut the motor activation switch in a second plunger position to deactivate the motor.

3. The device of claim 1, wherein the syringe comprises a barrel and a plunger slidably disposed in the barrel and movable to evacuate the tissue chamber, and the device further comprises:
    a housing supporting the barrel;
    a linkage coupled to the housing and movable between a first configuration, in which the linkage is V-shaped and distanced from a motor switch to deactivate the motor, and second configuration, in which the linkage is substantially straight and engages the motor switch to energize the motor.

4. The device of claim 1, further comprising a control circuit configured to rotate the needle in a first direction when the motor is energized, and after a predetermined time period, rotate the needle in an opposite direction.

5. The device of claim 1, further comprising a linkage configured to permit one handed operation or a single one finger motion which starts the motor and pulls the vacuum in the needle.

6. The device of claim 1, further including a gear assembly coupling the needle to the motor to cause axial reciprocation of the needle during operation of the motor.

7. The device of claim 6, wherein the gear assembly comprises:
    a first needle gear operable to rotate under influence of the motor;
    a fixed gear constrained from rotating under the influence of the motor, the first needle gear being coupled in a Hirth-fashion to the fixed gear such that teeth of the first needle gear rotate past and ride against teeth of the fixed gear to cause the first needle gear to reciprocate axially.

8. The device of claim 7, wherein the gear assembly comprises:
    a second needle gear concentric with the first needle gear;
    a drive gear concentric with the fixed gear and coupled in a Hirth-fashion to the second needle gear, the drive gear being coupled to the motor to rotate the second needle gear as the motor rotates the drive gear.

9. The device of claim 8, wherein the first needle gear and the second needle gear are coupled with each other.

10. The device of claim 1, wherein the motor is a non-electric tension assembly coupled to the needle to rotate the needle.

11. The device of claim 10, further comprising a gear assembly coupling the needle to the non-electric tension assembly to cause axial reciprocation of the needle.

12. The device of claim 10, wherein the non-electric tension assembly comprises:
    a gear coupled to the needle to rotate the needle;
    an axle supporting the gear and engaged with a spring, the axle being coupled to an activation mechanism to rotate as the activation mechanism moves; and
    a brake for selectively engaging the gear to prevent the gear from rotating, the axle being configured for rotation of the gear with the brake engaged to tension the spring, the brake being releasable from the gear to allow the spring to de-tension to rotate the gear and the needle.

13. The device of claim 12, wherein actuation of the activation mechanism to move the plunger tensions a coil spring with a spring gear being stopped from rotation by a brake releasable to allow the spring gear to de-tension to rotate the needle.

14. The device of claim 10, wherein the non-electric tension assembly comprises:
    a drive gear;
    an axle on which the drive gear rotates;
    the axle being coupled to a movable mechanism, such that the axle rotate as the movable mechanism moves;
    a spring gear meshed with the drive gear to rotate the spring gear against tension provided by a coil spring coupled to the spring gear;
    the spring gear being meshed with a transfer gear;

the transfer gear being meshed with a needle drive gear to transfer rotational motion of the transfer gear to the needle drive gear to rotate the needle.

15. A device comprising:
a needle, the needle further including:
   a proximal end and a distal end with a main body extending therebetween;
   a hollow interior extending through the main body;
   a first cutting aperture disposed through the main body;
   a second cutting aperture disposed through the main body;
   each of the first cutting aperture and the second cutting apertures creating a channel with a central axis extending from an exterior surface to an interior surface of the main body, wherein the central axes of the channels are axially aligned relative to each other; and
   the first cutting aperture and the second cutting aperture longitudinally spaced in a proximal direction from the distal end of the main body, such that there is a continuous portion of the main body between the first cutting aperture and the second cutting apertures and the distal end of the main body;
a motor operably coupled to the needle to rotate the needle about a central longitudinal axis of the needle and reciprocate the needle in an axial direction relative to the central longitudinal axis;
a switch to energize the motor;
a barrel and a plunger slidably disposed in the barrel and movable to evacuate the barrel; and
a plunger activation assembly configured to operably engage the plunger, the plunger activation assembly being movable to open and close the switch.

16. The device of claim 15, wherein the plunger activation assembly comprises a receptacle configured for closely receiving a proximal flange of the plunger, and opposed arms extending distally away from the receptacle, at least one of the arms comprising an inclined ramp that abuts a motor activation switch in a first plunger position to activate the motor and that does not abut the motor activation switch in a second plunger position to deactivate the motor.

17. The device of claim 15, further comprising:
a housing supporting the barrel;
a linkage coupled to the housing and movable between a first configuration, in which the linkage is V-shaped and distanced from a motor switch to deactivate the motor, and second configuration, in which the linkage is substantially straight and engages the motor switch to energize the motor.

18. The device of claim 15, further comprising a control circuit configured to rotate the needle in a first direction when the motor is energized, and after a predetermined time period, rotate the needle in an opposite direction.

19. The device of claim 15, further comprising a linkage configured to permit one handed operation or a single one finger motion which starts the motor and pulls a vacuum in the needle.

20. The device of claim 15, further including a gear assembly coupling the needle to the motor to cause axial reciprocation of the needle during operation of the motor.

* * * * *